United States Patent
Tajiri

(10) Patent No.: US 7,720,899 B2
(45) Date of Patent: May 18, 2010

(54) ARITHMETIC OPERATION UNIT, INFORMATION PROCESSING APPARATUS AND ARITHMETIC OPERATION METHOD

(75) Inventor: Kunihiko Tajiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1050 days.

(21) Appl. No.: 11/385,718

(22) Filed: Mar. 22, 2006

(65) Prior Publication Data

US 2007/0130242 A1    Jun. 7, 2007

(30) Foreign Application Priority Data

Dec. 2, 2005    (JP) .............................. 2005-349804

(51) Int. Cl.
    G06F 7/38    (2006.01)
(52) U.S. Cl. .................................... 708/497
(58) Field of Classification Search ................ 708/497
    See application file for complete search history.

(56) References Cited

U.S. PATENT DOCUMENTS

| 5,128,889 | A   |   | 7/1992  | Nakano              |         |
|-----------|-----|---|---------|---------------------|---------|
| 5,471,410 | A   |   | 11/1995 | Bailey et al.       |         |
| 5,742,535 | A   | * | 4/1998  | Schwarz et al.      | 708/499 |
| 5,754,458 | A   | * | 5/1998  | Beraha et al.       | 708/497 |
| 5,771,183 | A   |   | 6/1998  | Makineni            |         |
| 5,793,654 | A   | * | 8/1998  | Doshi et al.        | 708/209 |
| 6,557,021 | B1  | * | 4/2003  | Brooks et al.       | 708/496 |
| 6,571,266 | B1  |   | 5/2003  | Bass                |         |
| 6,615,228 | B1  |   | 9/2003  | Colon-Bonet et al.  |         |

2004/0044716 A1    3/2004    Colon-Bonet

FOREIGN PATENT DOCUMENTS

| JP | 63-229521  | 9/1988 |
| JP | 3-67328    | 3/1991 |
| JP | 3-211617   | 9/1991 |
| JP | 8-212192   | 8/1996 |
| JP | 2002-7111  | 1/2002 |
| JP | 2002-251281| 9/2002 |

OTHER PUBLICATIONS

Chinese Patent Office Action issued Feb. 22, 2008 for corresponding Chinese Patent Application No. 2006100764824.
Extended European Search Report, mailed Oct. 7, 2008 and issued in corresponding European Patent Application No. 06251769.3-1229.
Japanese Office Action mailed on Sep. 1, 2009 in corresponding Japanese Patent Application 2005-349804.

* cited by examiner

Primary Examiner—Tan V Mai
(74) Attorney, Agent, or Firm—Staas & Halsey LLP

(57) ABSTRACT

An arithmetic operation unit, which generates information representing whether or not an arithmetic operation result has been shifted when the arithmetic operation result is normalized, has an arithmetic logical unit outputting the arithmetic operation result, a normalizer having a plurality of shifter normalizing the arithmetic operation result, a shift amount calculator calculating a plurality of shift amounts for the plural shifter, and a predictor generating interim information that is a result of prediction of whether or not the arithmetic operation result is to be shifted when the arithmetic operation result is normalized, by using the plural shift amounts, and a generator generating the information by using the interim information. The cycle time required to generate a sticky bit is shortened to efficiently generate the sticky bit, and the hardware resources for generating the sticky bit is reduced.

15 Claims, 13 Drawing Sheets

FIG. 5

(a) C<94:91> : when SA<5:2>=0000, always remaining ⇒ PAT<14> when SA<5:2>=0001, prediction result is not used,
but generator 52 performs the process by using shift resul (b) C<90:87> : when SA<5:2><=0001, always remaining ⇒ PAT<13> when SA<5:2>=0010, prediction result is not used,
but generator 52 performs the process by using shift result

⋮

(c) C<38:35> : when SA<5:2><=1110, always remaining ⇒ PAT<0> when SA<5:2>=1111, prediction result is not used,
but generator 52 performs the process by using shift result

FIG. 9

(a)  C<65:62> : when SA<5:2>=0000, always remaining ⇒ PAT<14> when SA<5:2>=0001, prediction result is not used,
but generator 52 performs the process by using shift result (b)  C<61:58> : when SA<5:2><=0001, always remaining ⇒ PAT<13> when SA<5:2>=0010, prediction result is not used,
but generator 52 performs the process by using shift result

⋮

(c)  C<9:6> : when SA<5:2><=1110, always remaining ⇒ PAT<0> when SA<5:2>=1111, prediction result is not used,
but generator 52 performs the process by using shift result "1" at the head is shifted to bit 124 by second shifter

ARITHMETIC OPERATION UNIT, INFORMATION PROCESSING APPARATUS AND ARITHMETIC OPERATION METHOD

BACKGROUND OF THE INVENTION

Field of the Invention

The present invention relates to a technique for rounding an arithmetic operation result by using a sticky bit in a floating-point multiply adder (FMA) in an arithmetic operation unit. Particularly, the present invention relates to a technique for efficiently obtaining a sticky bit when the prediction theory, which determines a normalizing shift amount used in a rounding of a arithmetic operation result within a range of an error of a predetermined bit (for example, "1" bit) is used.

A floating-point multiply adder (FMA) used heretofore is structured as shown in FIG. 12, for example. A floating-point multiply adder 100 shown in FIG. 12 comprises a right shifter (Aligner) 10, a multiplier [CSA (Carry Save Adder) Tree] 11, a CSA (Carry Save Adder) 12, an absolute value adder (Abs. Adder) 13, a shift amount calculator [L. Z. (Leading Zero) Predictor] 20, a normalizer (Left Shifter) 300 and a rounder 400.

The floating-point multiply adder 100 supports the single-precision arithmetic and the double-prediction arithmetic in conformity to IEEE (The Institute of Electrical and Electronics Engineers, Inc.) 754.

The right shifter 10, the multiplier 11, the CSA 12 and the absolute value adder 13 together function as a multiply adder unit which executes a floating-point multiply-add arithmetic operation with three operands ("OP1," "OP2" and "OP3" in FIG. 12).

The shift amount calculator 20 determines how many zeros continue from the lead of output data (arithmetic operation result; refer to FIG. 13 to be described later) from the absolute value adder 13. A result of this is a shift amount to be inputted to the normalizer 300. Namely, the shift amount calculator 20 calculates a normalizing shift amount used in the left shifting process (normalizing process) by the normalizer 300.

In the floating-point multiple-adder 100, the shift amount calculator 20 calculates a normalizing shift amount in parallel to the process by the absolute value adder 13, in order to attain high-speed operation. The shift amount calculator 20 calculates a normalizing shift amount, by using not output data from the absolute value adder 13 but output data from the CSA 12 in the preceding stage (that is, input data to the absolute value adder 13). The normalizing shift amount calculated by the shift amount calculator 20 is data expressed as "7" bits, and outputted to the normalizer 300.

In the shift amount calculator 20, the normalizing shift amount calculated sometimes comes short by "1" bit.

The normalizer 300 shifts output data (hereafter referred to as an arithmetic operation result) from the absolute value adder 13, by using the normalizing shift amount calculated by the shift amount calculator 20, where a value at a predetermined bit position in the arithmetic operation result is always set to "1" by the normalizer 300.

The rounder 400 rounds the arithmetic operation result normalized by the normalizer 300. The rounder 400 generates a sticky bit necessary for the rounding process by itself. Namely, when there is "1" within a region (sticky bit generation region; refer to FIGS. 14 and 15 to be described later) to be omitted excepting the mantissa in the arithmetic operation result, the rounder 400 performs a rounding process to add "1" to the mantissa in order to improve the precision of the mantissa (refer to FIGS. 14 and 15 to be described later) in the arithmetic operation result that is output data from the floating-point multiply-adder 100.

The arithmetic operation result, as shown in FIG. 13, which is output data from the absolute value adder 13, is data having a length of "128" bits (data consisting of "0"s and "1"s), for example, expressed as C<127:0>. Incidentally, C<127:125> is a fixed value "000."

When the floating-point multiply-adder 100 supports the single-precision arithmetic, the output data (R<127:0>) from the normalizer 300 normalized by the normalizer 300 is formed as shown in FIG. 14.

In the arithmetic operation result of "128" bits, R<127:124>, which consists of "4" bits from the highest digit, is a fixed value field, R<123:101> consisting of "23" bits is the mantissa, following R<100> is a G (guard) bit, R<99> is an R (round) bit, and the remaining R<98:0> consisting of "99" bits is a sticky bit generation region, which is a region for which a sticky bit is generated.

When the floating-point multiply-adder 100 supports the double-precision arithmetic, the output data (R<127:0>) from the normalizer 300 normalized by the normalizer 300 is formed as shown in FIG. 15.

In the arithmetic operation result of "128" bits, R<127:124> consisting of "4" bits from the highest digit is a fixed value field, R<123:72> consisting of "52" bits is the mantissa, the following R<71> is the G (guard) bit, R<70> is the R (round) bit, and the remaining R<69:0> consisting of "70" bits is the sticky bit generation region for which a sticky bit is generated.

In the case of the single-precision arithmetic and the double-precision arithmetic shown in FIGS. 14 and 15, respectively, R<127:124> is the fixed value field, the values of which are "0000," but the value of R<124> is always set to "1" by the normalizing process by the normalizer 300.

FIG. 16 shows structures of the normalizer 300 and the rounder 400. As shown in FIG. 16, the normalizer 300 comprises a plurality of shifters 31 through 35, that is, a first shifter (1st left shifter) 31, a second shifter (2nd left shifter) 32, a third shifter (3rd left shifter) 33, a fourth shifter (4th left shifter) 34 and a one-bit left shifter (1 bit left shifter) 35.

The first to fourth shifters 31 through 34 normalize (left-shifts) the arithmetic operation result, by using a normalizing shift amount SA<6:0> (SA: Shift Amount) calculated as data having a length of "7" bits by the shift amount calculator 20.

Since the input data (arithmetic operation result) is data of "128" bits as shown in FIG. 13, the shift amount (that is, the normalizing shift amount calculated by the shift amount calculator 20) obtained by the first to fourth shifters 31 through 34 is "127" bit at maximum. Thus, the first shifter 31 can shift by "64" bits or "0" bit as being the normalizing shift amount on the basis of 1-bit data in the 7-bit-long data, the second shifter 32 can shift by "48," "32," "16" or "0" bit on the basis of 2-bit data in the 7-bit-long data, the third shifter 33 can shift by "12," "8," "4" or "0" bit on the basis of 2-bit data in the 7-bit-long data, and the fourth shifter 34 can shift by "3," "2," "1" or "0" bit on the basis of 2-bit data in the 7-bit-long data.

The 1-bit shifter 35 determines whether or not the value at the predetermined bit position (here, R<124>) is so shifted as to be "1" as a result of the normalizing process by the fourth shifter 34. When the value at the predetermined bit position is not "1," the 1-bit shifter 35 determines that the normalizing shift amount calculated by the shift amount calculator 20 comes short by "1" bit, whereby the fourth shifter 34 further shifts to the left by "1" bit the arithmetic operation result normalized by the fourth shifter 34. As a result, the value of the data at the predetermined bit position is "1."

Namely, the 1-bit shifter 35 determines whether or not the value at the predetermined bit position of the output data fed from the fourth shifter 34 is "1". When the value is "1," the 1-bit shifter 35 does not execute the shifting process. When the value at the predetermined bit position is "0" because the normalizing shift amount calculated by the shift amount calculator 20 comes short by "1" bit, the 1-bit shifter 35 shifts by only "1" bit the output data from the fourth shifter 34 so that the value at the predetermined bit position is "1," in order to complete the normalizing process.

As shown in FIG. 16, the rounder 400 comprises an incrementer 41, a sticky bit generator 42, a judge round unit 43 and a selecting circuit 44.

The incrementer 41 performs a rounding process to add "1" to the mantissa (R<123:101> in the case of the single-precision arithmetic or R<123:72> in the case of the double-precision arithmetic) in the arithmetic operation result normalized by the normalizer 300.

The sticky bit generator 42 generates a sticky bit used by the judge round unit 43 to determine whether or not the arithmetic operation result rounded by the incrementer 41 is finally outputted. The sticky bit generator 42 determines whether or not data of "1" is included in the sticky bit generation region by performing the OR operation on all data in the sticky bit generation region. When at least one "1" is included in the sticky bit generation region, the sticky bit generator 42 sets the sticky bit to "1."

In the case of the single-precision arithmetic, the sticky bit generator 42 determines whether or not "1" is present in the sticky bit generation region, by performing the OR operation on data of "99" bits in R<98:0>, thereby generating a sticky bit. In the case of the double-precision arithmetic, the sticky bit generator 42 generates a sticky bit by performing the OR operation on data of "70" bit in R<69:0>.

The judge round unit 43 determines whether or not the rounding process is necessary, on the basis of the sticky bit generated by the sticky bit generator 42, the L (Least significant) bit which is the least significant bit of the mantissa in the arithmetic operation result, the G (Guard) bit, the R (Round) bit (refer to FIGS. 14 and 15), an RD (Round Direction) bit inputted from the outside and an SIGN bit. And, the judge round unit 43 outputs a result of the determination to the selecting circuit 44.

The selecting circuit 44 outputs either the rounded arithmetic operation result inputted via the incrementer 41 or the arithmetic operation result left as it has been outputted from the normalizer 300 on the basis of the determination result obtained by the judge round unit 43.

Namely, when the judge round unit 43 determines as a result of the determination that the rounding process is necessary, the selecting circuit 44 outputs the arithmetic operation result rounded by the incrementer 41. When the judge round unit 43 determines as a result of determination that the rounding process is unnecessary, the selecting circuit 44 outputs the arithmetic operation result not rounded, which is left as it has been outputted from the normalizer 300.

There has been a technique that generates a sticky bit by masking the mantissa in the multiply-add operation result before normalized, with a mask generated on the basis of the normalizing shift amount (for example, refer to Japanese Patent Application Laid-Open Publication No. HEI 8-212192; hereinafter referred to as Patent Document 1).

In the known floating-point multiply adder 100 shown in FIG. 12 needs the OR operation on data of a maximum of 99-bit length (in the case of the single-precision arithmetic) in order that the sticky bit generator 42 generates a sticky bit. This causes a larger delay than that of "56" bits processed by the incrementer 41, which is almost the same as processing 56-bit-long data by an AND circuit.

Further, in the floating-point multiply adder 100, the normalizer 300 normalizes the arithmetic operation result, the sticky bit generator 42 generates a sticky bit, then the judge round unit 43 judges about the rounding, whereby data is selected. For this, a large delay occurs between the time when data is outputted from the normalizer 300 and the time when data is outputted from the rounder 400 (that is, from the floating-point multiply adder 100).

In recent years, the frequency of the central processing unit on which the floating-point multiply adder 100 is mounted largely exceeds 2 GHz. Since the cycle time of such frequency exceeding 2 GHz is very short, it is difficult to execute the normalizating process in one cycle in the normalizer 300, which requires a delay time equal to or larger than a delay time that the shifter (left shifter) having a 128-bit width requires. It is difficult to execute the process by the rounder 400 in the same cycle time, to say nothing of. Therefore, it is general to divide the pipeline stage between the process by the normalizer 300 and the process by the rounder 400, as denoted by a broken line Y in FIG. 17. The example shown in FIG. 17 supports the single-precision arithmetic. As denoted by a broken line X, the pipeline stage is divided between the process by the first shifter 31 and the process by the second shifter 32. As denoted by a broken line Z, the pipeline stage is divided after the selecting circuit 44 outputs a result.

When the pipeline stage is divided as shown in FIG. 17, it is necessary to latch the data at a position where the pipeline stage is divided. On the boundary between the process by the normalizer 300 and the process by the rounder 400, data of "128" bits is latched. Namely, in this staging latch, the data of "99" bits (R<98:0>) in the sticky bit generation region to be used only to generate a sticky bit by the sticky bit generator 42 has to be latched, which leads to a large increase in placement and routing (amount of materials) for the staging latch. When the double-precision arithmetic is supported, the 70-bit-long data (R<69:0>) in the sticky bit generation region has to be latched in order to generate only the sticky bit.

The technique disclosed in the above Patent Document 1, it is necessary to make two kinds of masks, a mask to be used when the normalizing shift amount does not come short by "1" bit, and a mask to be used when the normalizing shift amount comes short by "1" bit, in order to cope with a case where the normalizing shift amount calculated by the shift amount calculator (the highest digit detector unit) comes short by "1" bit.

Then, it is necessary to adopt either (1) a method in which it is determined whether or not the normalizing shift amount comes short by "1" bit according to a result of the normalizing process, and either one of the two kinds of mask is employed, or (2) a method in which results of processes obtained by using the two kinds of masks are prepared, and either one of the results of the processes is selected on the basis of a result of the normalizing process.

However, when the method (1) is adopted, the delay becomes large. When the method (2) is adopted, the hardware resources (amount of materials) and the amount of the OR operation for the masking are increased.

SUMMARY OF THE INVENTION

In the light of the above problems, an object of the present invention is to shorten the cycle time required to generate a sticky bit and to efficiently generate the sticky bit while reducing the hardware resources for generating the sticky bit.

Therefore, the present invention provides an arithmetic operation unit performing a rounding process on an arithmetic operation result by using a sticky bit representing whether or not "1" has been shifted when the arithmetic operation result is normalized, the arithmetic operation unit comprising an arithmetic operation means for outputting the arithmetic operation result, a normalizer having at least two or more shifting means to perform a normalizing process on the arithmetic operation result, a shift amount calculator for calculating a plurality of shift amounts for the plural shifting means, a sticky bit predicting means for generating an interim sticky bit which is a result of prediction of whether or not "1" is to be shifted when the arithmetic operation result is normalized, by using the plural shift amounts, and a sticky bit generator for generating the sticky bit by using the interim sticky bit.

The arithmetic operation unit according to this invention further comprises a judge round means for outputting a result of judgment about whether or not the rounding process is performed by using the sticky bit, an incrementing means for adding "1" to the arithmetic operation result, and a selecting means for selecting either the arithmetic operation result or an output from the incrementing means by using the result of the judgment.

The present invention further provides an information processing apparatus performing an arithmetic operation by means of an arithmetic operation unit performing a rounding process on an arithmetic operation result by using a sticky bit representing whether or not "1" has been shifted when the arithmetic operation result is normalized, the arithmetic operation unit comprising an arithmetic operation means for outputting the arithmetic operation result, a normalizer having at least two or more shifting means to perform a normalizing process on the arithmetic operation result, a shift amount calculator for calculating a plurality of shift amounts for the plural shifting means, a sticky bit predicting means for generating an interim sticky bit which is a result of prediction of whether or not "1" is to be shifted when the arithmetic operation result is normalized, by using the plural shift amounts, and a sticky bit generator for generating the sticky bit by using the interim sticky bit.

The above arithmetic operation unit further comprises a judge round means for outputting a result of judgment about whether or not the rounding process is performed by using the sticky bit, an incrementing means for adding "1" to the arithmetic operation result, and a selecting means for selecting either the arithmetic operation result or an output from the incrementing means by using the result of the judgment.

The present invention still further provides an arithmetic operation method for performing a rounding process on an arithmetic operation result by using a sticky bit representing whether or not "1" has been shifted when the arithmetic operation result is normalized, the method comprising a step of outputting the arithmetic operation result, a shift amount calculating step of calculating a plurality of shift amounts to be used at least two or more shifting process steps, a normalizing step of performing a normalizing process on the arithmetic operation result by dividing the normalizing process into the plural shifting process steps and using the plural shift amounts at the plural shifting process steps, respectively, a sticky bit predicting step of generating an interim sticky bit which is a result of prediction of whether or not "1" is to be shifted when the arithmetic operation result is normalized, by using the plural shift amounts, and a sticky bit generating step of generating the sticky bit by using the interim sticky bit.

According to this invention, the logical sum calculating unit calculates an interim sticky bit in parallel to the normalizing process by the normalizer, and the generator generates a sticky bit on the basis of the interim sticky bit and data in a part of the sticky bit generation region in the arithmetic operation result normalized by the normalizer. Hence, it becomes unnecessary to calculate a logical sum of all data in the sticky bit generation region after the normalizing process. This can prevent an increase in delay and makes it possible to efficiently generate the sticky bit.

Concretely, although the known OR circuit needs "99" inputs, the OR circuit according to this invention needs only "5" inputs, which can largely shorten the arithmetic operation delay and reduce the number of stages of the pipeline, and contribute to improvement of the clock frequency.

When the pipeline stage is divided between the normalizing process by the normalizer and the process by the rounder, the sticky bit is generated in parallel to the normalizing process. Thus, a latching of all the arithmetic operation result is unnecessary, but a latching of only a region obtained by subtracting the sticky bit regeneration region from the arithmetic operation result is necessary. This contributes to a reduction in hardware resources of the staging latches and placement of routing for the latching. Practically, the width of the latch, which heretofore needs "128" bits for the purpose of the single-precision arithmetic and the double-precision arithmetic, can be decreased to "60" bits, which permits a large decrease in the amount of materials for the placement and routing.

The second region, which is a region to be processed by the sticky bit generator, includes a region that can be processed by the 1-bit shifter performing the normalizing process for a deficient amount of the normalizing shift amount. For this, it is unnecessary to prepare exclusive hardware to cope with whether or not the normalizing shift amount calculated by the shift amount calculator comes short by a predetermined number of bits, hence the sticky bit can be certainly generated irrespective of whether the normalizing shift amount comes short.

Unlike the technique disclosed in Patent Document 1 described above, it is possible to avoid an increase in delay or an increase in amount of materials caused by discrimination of whether or not the normalizing shift amount comes short by a predetermined number of bits.

Accordingly, this invention can largely reduce the amount of materials, as well as the arithmetic operation delay and the number of stages of the pipeline, as compared with the known technique where a sticky bit is generated after the arithmetic operation result is normalized.

BRIEF DESCRIPTION OF THE DRAWINGS

FIGS. 5(a) through 5(c) are diagrams for illustrating operations of the logical sum calculating unit of the sticky bit generator when the arithmetic operation unit according to the embodiment of this invention supports the single-precision arithmetic, each of FIGS. 5(a) through 5(c) being diagrams for illustrating operations on a part of a sticky bit generation region;

FIGS. 9(a) through 9(c) are diagrams for illustrating operations of the logical sum calculating unit of the sticky bit generator when the arithmetic operation unit according to the embodiment of this invention supports the double-precision arithmetic, each of FIGS. 9(a) through 9(c) being a diagram for illustrating an operation on a part of the sticky bit generation region;

DESCRIPTION OF THE PREFERRED EMBODIMENTS

Figure 1:
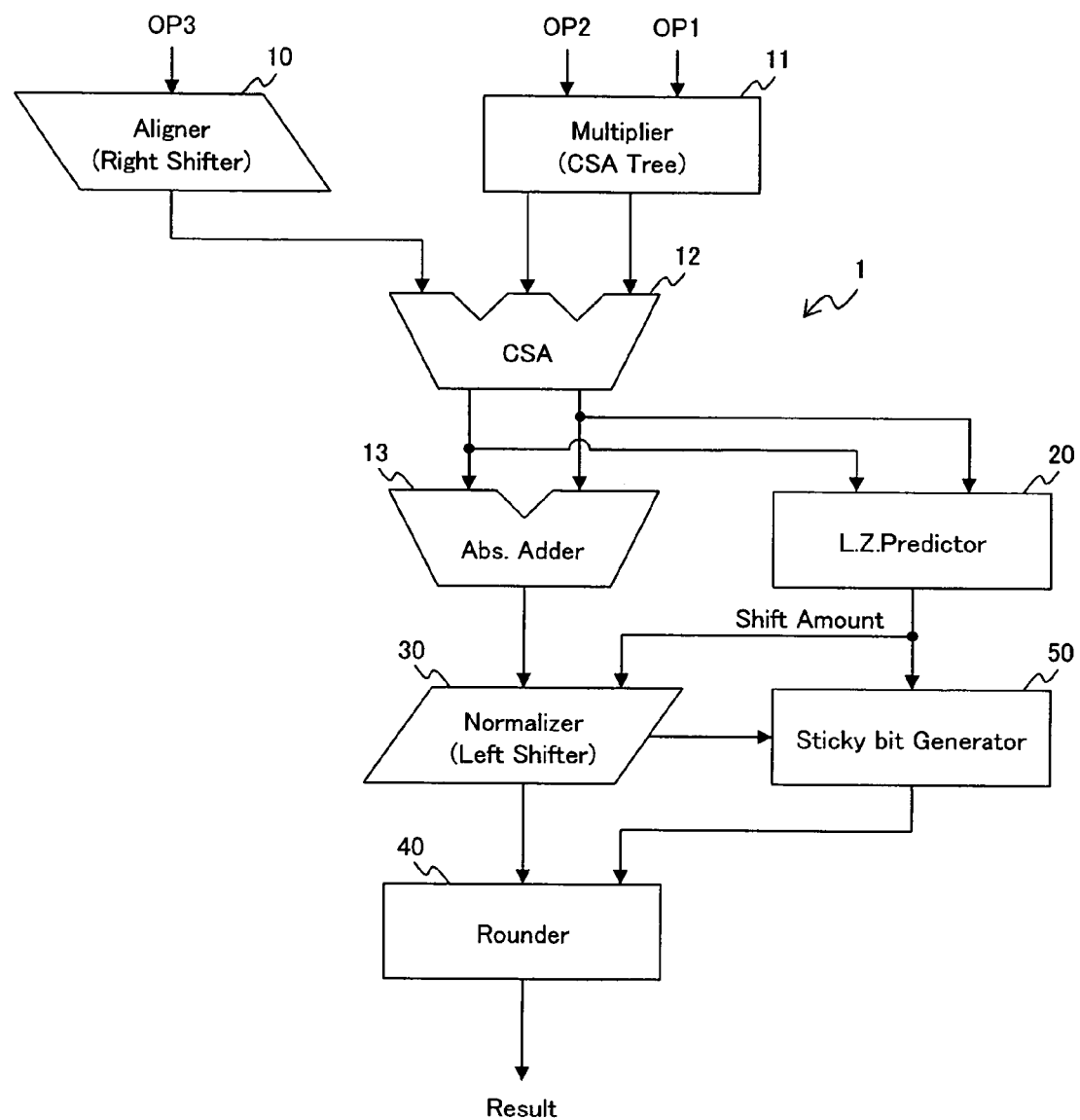
FIG. 1 is a block diagram showing a structure of an arithmetic operation unit according to an embodiment of this invention.

Hereinafter, description will be made of embodiments of this invention with reference to the drawings.

[1] Embodiment of the Invention in the Case of Single-Precision Arithmetic

First, a structure of a floating-point multiply adder according to an embodiment of this invention will be described with reference to a block diagram shown in FIG. 1. Incidentally, like reference characters designate like or corresponding parts in the drawings, details descriptions of which are thus partly omitted here.

As shown in FIG. 1, a floating-point multiply adder 1 comprises a right shifter (Aligner) 10, a multiplier [CSA (Carry Save Adder) Tree] 11, a CSA (Carry Save Adder) 12, an absolute value adder (Abs. Adder) 13, a shift amount calculator [(L. Z. Predictor)] 20, a normalizer (Left Shifter) 30, a rounder 40 and a sticky bit generator 50.

The floating-point multiply adder 1 supports the single-precision arithmetic in conformity to IEEE (The Institute of Electrical and Electronics Engineers, Inc.) 754.

Figure 13:
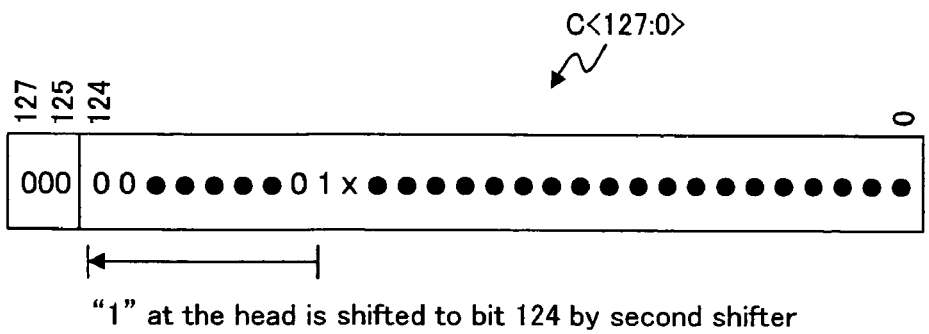
FIG. 13 is a diagram for illustrating a data format inputted to a second shifter.

Output data (arithmetic operation result; input data format to the normalizer 30) from the absolute value adder 13 is the same as that (C<127:0>) shown in FIG. 13. Data structure (output data format from the normalizer 30) to be used when the floating-point multiply adder 1 supports the single-precision arithmetic is the same as that (R<127:0>) shown in FIG. 14. In the following description, the arithmetic operation result (input data format) and the output data (output data format) will be described with reference to FIGS. 13 through 15, as well.

The right shifter 10, the multiplier 11, the CSA 12 and the absolute value adder 13 function together as a multiply-add operation unit executing a floating-point multiply-add operation with three operands ("OP1," "OP2" and "OP3" in the drawing). The arithmetic operation result (that is, output data from the absolute value adder 13) obtained by the multiply-add operation unit is expressed as C<127:0> as shown in FIG. 13.

The shift amount calculator 20 predicts how many zeros succeed from the lead of the output data (arithmetic operation result) from the absolute value adder 13. This result becomes a shift amount of the normalizer 30. The shift amount calculator 20 calculates a normalizing shift amount for the arithmetic operation result for use in the left-shifting process (normalizing process) by the normalizer 30. The normalizing shift amount calculated by the shift amount calculator 20 sometimes comes short by "1" bit.

The normalizer 30 conducts the left-shifting process (normalizing process) on the output data (hereinafter referred to as arithmetic operation result, occasionally) from the absolute value adder 13, by using the normalizing shift amount calculated by the shift amount calculator 20. The value at a predetermined bit position (R<124>, here) in the arithmetic operation result is always set to "1" by the normalizer 30.

Figure 2:
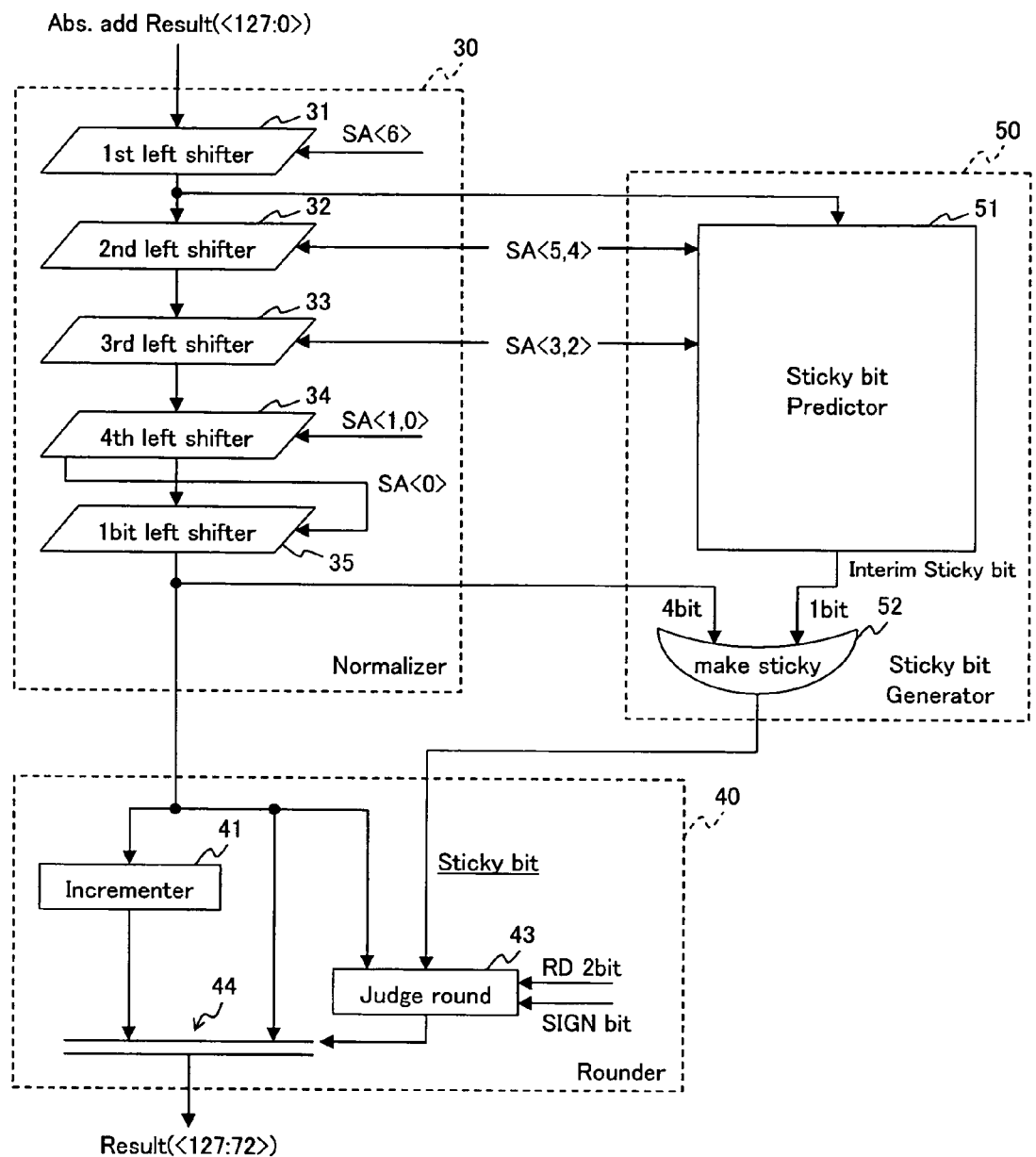
FIG. 2 is a block diagram showing structures of a normalizer, a sticky bit generator and a rounder of the arithmetic operation unit according to the embodiment of this invention.

FIG. 2 shows structures of the normalizer 30, the rounder 40 and the sticky bit generator 50 of the floating-point multiply-adder 1. As shown in FIG. 2, the normalizer 30 comprises a plurality of shifters 31 to 35, that is, a first shifter (1st left shifter) 31, a second shifter (2nd left shifter) 32, a third shifter (3rd left shifter) 33, a fourth shifter (4th left shifter) 34 and a 1-bit shifter [1 bit left shifter (second processing unit)] 35.

The first to fourth shifters 31 to 34 function together as a first processing unit which performs the normalizing process (left-shifting) on the arithmetic operation result by using the normalizing shift amount (7-bit data: SA<6:0>) calculated by the shift amount calculator 20.

Since the arithmetic operation result is data of "128" bits, the shift amount (that is, the normalizing shift amount calculated by the shift amount calculator 20) obtained by the first to fourth shifters 31 to 34 is "127" bits at maximum. Accordingly, the first shifter 31 can shift by "64" or "0" bit on the basis of SA<6> in the 7-bit-long data SA<6:0> which is the normalizing shift amount. The second shifter 32 can shift by "48," "32," "16" or "0" bit on the basis of SA<5:4> in SA<6:

0>. The third shifter 33 can shift by "12," "8," "4" or "0" bit on the basis of SA<3:2> in SA<6:0>. The fourth shifter 34 can shift by "3," "2," "1" or "0" bit on the basis of SA<1:0> in SA<6:0>.

To the first shifter 31, inputted is the data (SA<6>) of "1" bit in the normalizing shift amount outputted as the 7-bit-long data, which represents whether or not the normalizing shift amount is not less than "64" bits, that is, whether or not the first shifter 31 executes a process of shifting "64" bits, as described above. When SA<6> is "1," the first shifter 31 executes a shifting of "64" bits. When SA<6> is "0," the first shifter 31 does not execute a shifting.

When the normalizing shift amount inputted to the second to fourth shifters 32 to 34 is expressed as SA<5:0>, the second shifter 32 executes the normalizing process on the basis of SA<5:4>. The second shifter 32 executes a shifting of "48" bits when SA<5:4> is "11," executes a shifting of "32" bits when SA<5:4> is "10," executes a shifting of "16" bits when SA<5:4> is "01," and does not execute a shifting when SA<5:4> is "00."

Similarly, the third shifter 33 executes a shifting of "12" bits when SA<3:2> is "11," executes a shifting of "8" bits when SA<3:2> is "10," executes a shifting of "4" bits when SA<3:2> is "01," and does not execute a shifting when SA<3:2> is "00."

Likewise, the fourth shifter 34 executes a shifting of "3" bits when SA<1:0> is "11," executes a shifting of "2" bits when SA<1:0> is "10," executes a shifting of "1" bit when SA<1:0> is "01," and does not executes a shifting when SA<1:0> is "00."

The 1-bit shifter 35 determines whether or not the shifting is performed so that the value at the predetermined bit position R<124> is "1" as a result of the normalizing process based on the normalizing shift amount obtained by the fourth shifter 34 (whether or not the normalizing shift amount falls short). When the value at the predetermined bit position is not "1," the 1-bit shifter 35 determines that the normalizing shift amount calculated by the shift amount calculator 20 comes short by "1" bit, and further shifts by "1" bit the arithmetic operation result normalized by the fourth shifter 34. As a result, the value at the predetermined bit position becomes "1."

Namely, the 1-bit shifter 35 determines whether the value at the predetermined bit position in the output data from the fourth shifter 34 is "0" or "1." When the value is "1," the 1-bit shifter 35 does not execute the shifting process.

When the value at the predetermined bit position is "0" because the normalizing shift amount calculated by the shift amount calculator 20 comes short by "1" bit, the 1-bit shifter 35 shifts the output data from the fourth shifter 34 by only "1" bit in order to complete the normalizing process (that is, in order to set "1" at the predetermined position).

In the floating-point multiply adder 1, the sticky bit generator 50 generates a sticky bit in parallel to the normalizing process by the normalizer 30. For this, The normalizer 30 outputs to the rounder 40, not all bits of the arithmetic operation result undergone the normalizing process but a portion obtained by excepting the sticky bit generation region from the arithmetic operation result. In other words, inputted to the rounder 40 is 29-bit-long data R<127:99> in the case of the single-precision arithmetic.

As shown in FIG. 2, the sticky bit generator 50 generates a sticky bit in parallel to the normalizing process by the normalizer 30. The sticky bit generator 50 comprises a logical sum calculating unit (sticky bit predictor; predicting means) 51 and a generator (denoted as "make sticky" in the drawing; generator) 52.

Figure 14:
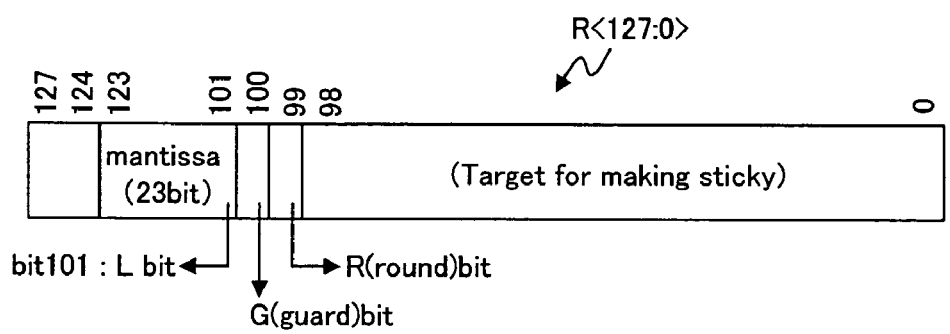
FIG. 14 is a diagram for illustrating output data in the case where the arithmetic operation unit of this invention and the known floating-point multiply adder support the single-precision arithmetic.
Figure 15:
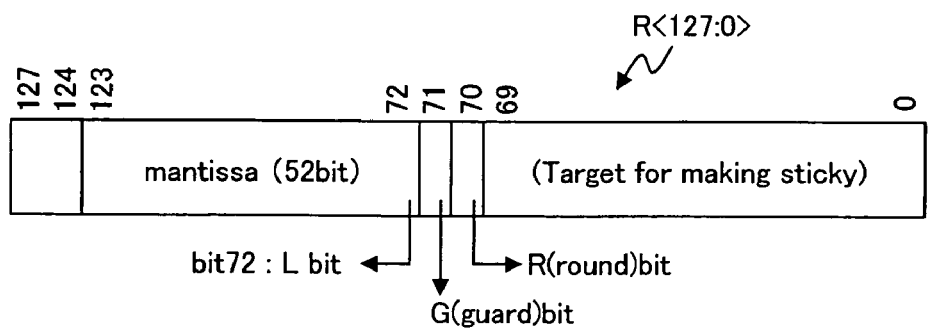
FIG. 15 is a diagram for illustrating output data in the case where the arithmetic operation unit of this invention and the known floating-point multiply adder support the double-precision arithmetic.
Figure 16:
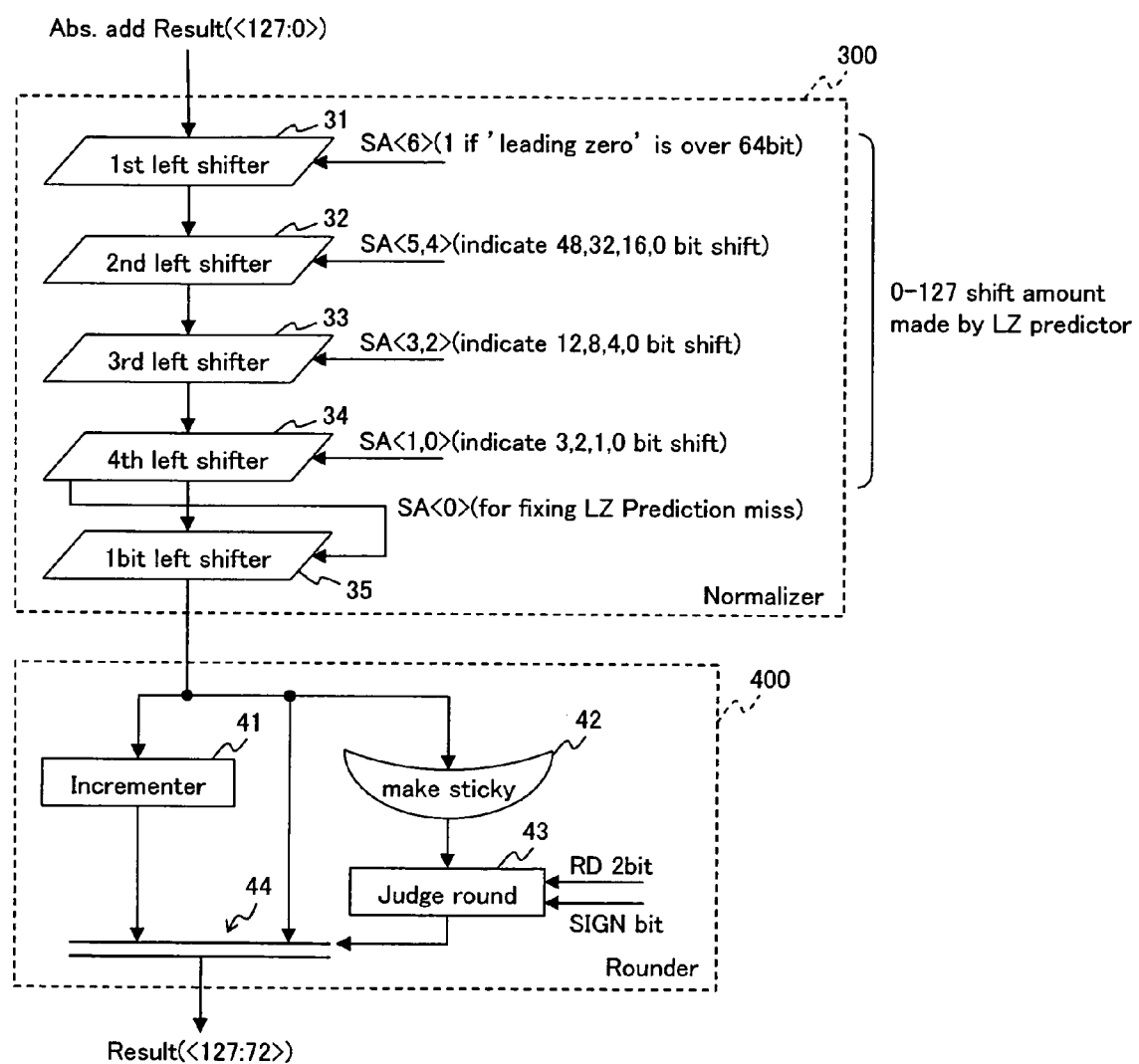
FIG. 16 is a diagram showing structures of a normalizer and a rounder of the known floating-point multiply adder.
Figure 17:
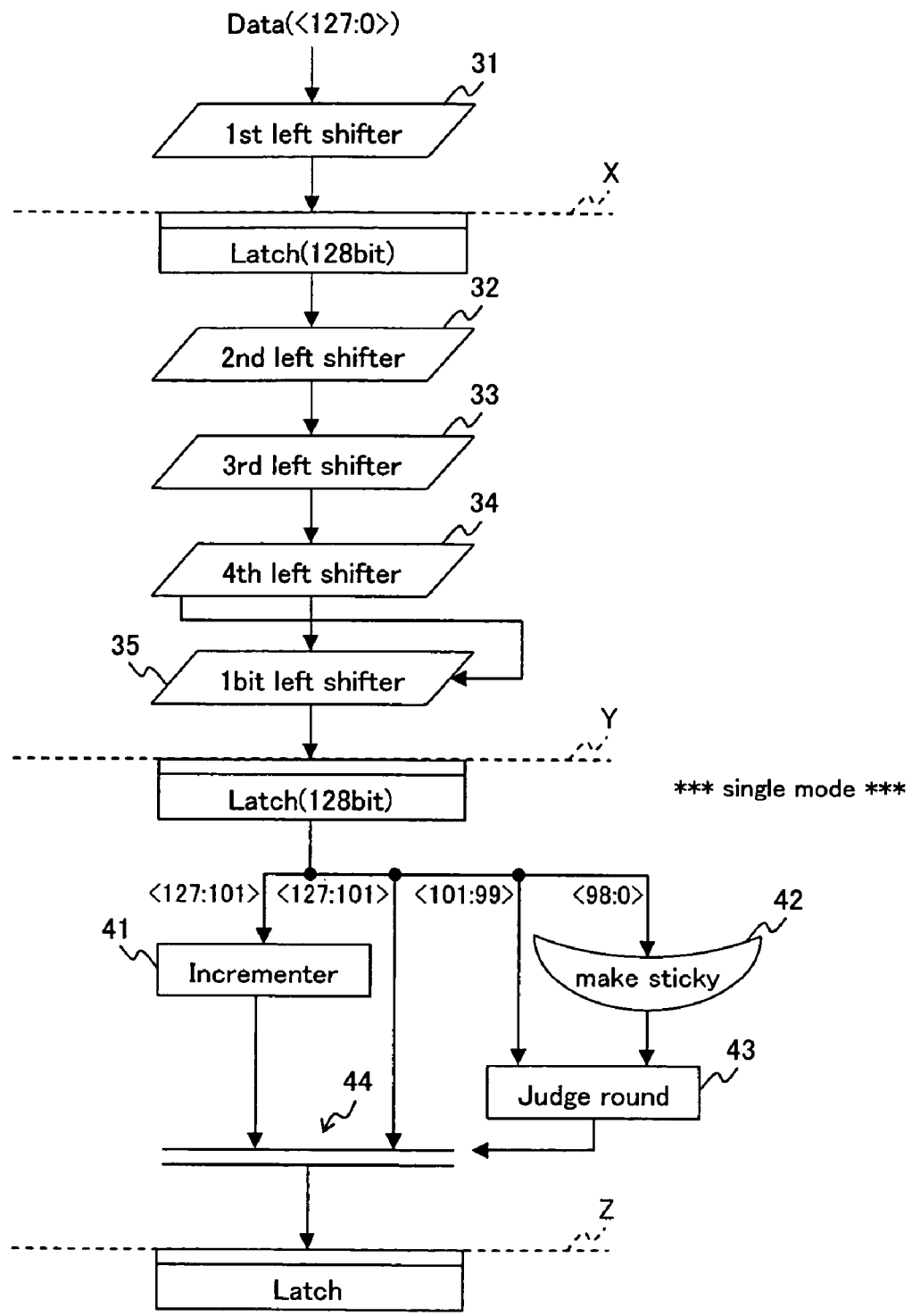
FIG. 17 is a diagram showing an example of an operation of the known floating-point multiply adder when the floating-point multiply adder supports the single-precision arithmetic, wherein the pipeline stage is divided.

In concrete, the sticky bit generator 50 sets the sticky bit to "ON" when even one bit is "1" in the sticky bit generation region (R<98:0>) in the case of the single-precision arithmetic in FIG. 14) in the output data (R<127:0>) from the normalizer 30, or sets the sticky bit to "OFF" when all the bits in the sticky bit generation region are "0." The sticky bit generator 50 generates a sticky bit by means of the logical sum calculating unit 51 and the generator 52.

The logical sum calculating unit 51 predicts whether or not data in the predetermined region from the lowest digit in the arithmetic operation result is shifted into the sticky bit generation region by the normalizing process by the normalizer 30, in parallel to the normalizing process by the normalizer 30, and calculates a logical sum of the data predicted to be shifted into the sticky bit generation region as an interim sticky bit.

Here, the logical sum calculating unit 51 predicts whether or not the data in the predetermined region (first region) in the arithmetic operation result normalized by the first shifter 31 is shifted into the sticky bit generation region by the normalizing process by the normalizer 30, by using the normalizing shift amount (4-bit data; SA<5:2>) inputted to the second shifter 32 and the third shifter 33, and determines whether or not the data predicted to be shifted into the sticky bit generation region includes "1." Whereby, the logical sum calculating unit 51 generates an interim sticky bit.

Now, a case where the floating-point multiply adder 1 supports the single-precision arithmetic supports will be described.

Since the normalizer 20 performs the left-shifting process in the floating-point multiply adder 1, a check on whether "1" is present in R<98:0> can be carried out by checking whether "1" is included in a region of C<98:0> by using the normalizing shift amount.

In concrete, the logical sum calculating unit 51 first performs the OR operation process on a region that will be included in R<98:0> even if the normalizing process is performed on "64" bits, which is obtained by adding "1" bit that the 1-bit shifter 35 can shift to "63" bits that is the maximum region that the second to fourth shifters 32 to 34 can shift, that is, a region that will remain in the sticky bit generation region irrespective of the normalizing shift amount.

In the case of the single-precision arithmetic, the logical sum calculating unit 51 performs the OR operation on C<34:0>, which is R<98:64> that will remain even if a left-shifting of "64" bits which is the maximum shift amount is executed.

Further, the logical sum calculating unit 51 performs the process on a region excepting a portion included in R<98:0> irrespective of the normalizing shift amount, that is, C<94:35> which is a region excepting C<34:0>, here. The logical sum calculating unit 51 performs the OR operation on each "4" bits of a portion of C<94:35> not shifted to the outside of R<98:0> even when the shifting process based on the normalizing shift amount (SA<5:2>) is performed, and verifies it. Why the OR operation is performed on each "4" bits is that the shift amount of the third shifter 33 changes by "4" bits.

Namely, as shown in FIG. 5(a), since the shift amount of C<94:91> falls within a range from "0" to "3" bits when SA<5:2> is "0000," C<94:91> always remains in the region of R<98:0>. For this, a result of the OR operation on C<94:91> is outputted as PAT<14> for this case only. When SA<5:2> is "0001," the shift amount falls within a range from "4" to "7" bits. For this, C<94:91> falls within the range of R<98:95> or is outside the range of R<98:0>. Therefore, the generator 52 performs the process.

Figure 6:
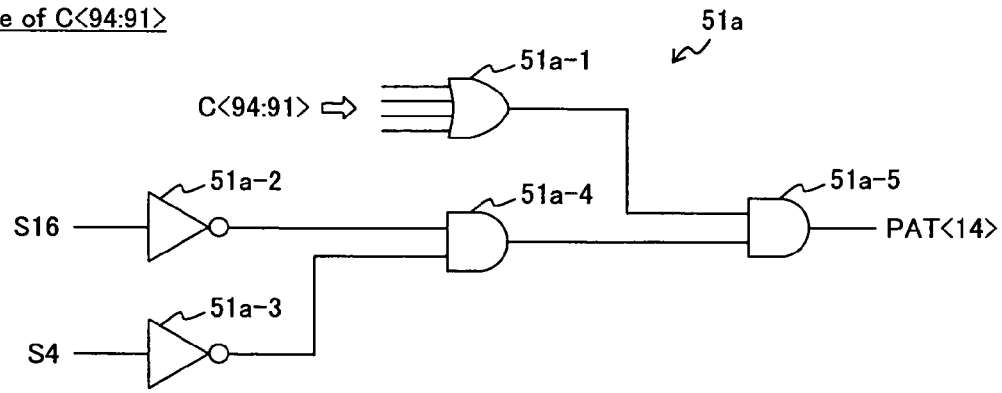
FIG. 6 is a diagram showing an example of a logical circuit of the logical sum calculating unit of the sticky bit generator in the arithmetic operation unit according to the embodiment of this invention.

The process shown in FIG. 5(a) is accomplished by a logical circuit 51a comprised of an OR gate, NOT gates and AND gates shown in FIG. 6, for example. Namely, the logical sum calculation circuit 51 has the circuit 51a. An input signal S16 to the logical circuit 51a is realized by a logical circuit 32a shown in FIG. 3, for example. Namely, the logical sum calculating unit 51 has the logical circuit 32a having an OR gate 32a-3 which outputs a logical sum of SA<5> and SA<4> as S16 (signal representing whether or not a shifting of not less than "16" bits is performed). Similarly, an input signal S4 to the logical circuit 51a is realized by a logical circuit 33a shown in FIG. 4, for example. Namely, the logical sum calculating circuit 51 has the logical circuit 33a having an OR gate 33a-3 which outputs a logical sum of SA<3> and SA<2> as S4 (signal representing whether or not a shifting of not less than "4" bits is performed).

As shown in FIG. 5(b), with respect to C<90:87>, when SA<5:2> is not less than "0001," C<90:87> always falls within a range of R<98:0>. For this, a result of the OR operation on C<90:87> is outputted as PAT<13>. When SA<5:2> is "0010," C<90:87> falls within a range of R<98:95> or is outside the range of R<98:0>. For this, the generator 52 performs the process using a result of the shifting without prediction.

Figure 7:
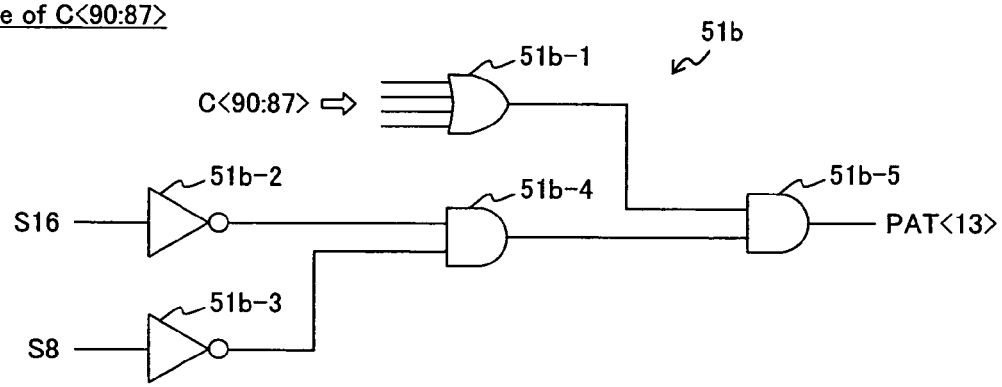
FIG. 7 is a diagram showing an example of a logical circuit of the logical sum calculating unit of the sticky bit generator in the arithmetic operation unit according to the embodiment of this invention.

The process shown in FIG. 5(b) is accomplished by a logical circuit 51b comprised of an OR gate, NOT gates and AND gates shown in FIG. 7, for example. Namely, the logical sum calculating unit 51 has the logical circuit 51b comprised of an OR gate 51b-1 outputting a logical sum of C<90:87>, NOT gates 51b-2 and 51b-3 inverting S16 and S8 and outputting them, respectively, an AND gate 51b-4 outputting a logical product of outputs from the NOT gates 51b-2 and 51b-3, and an AND gate 51b-5 outputting a logical product of an output from the OR gate 51b-1 and an output from the AND gate 51b-4 as PAT<13>.

Figure 3:
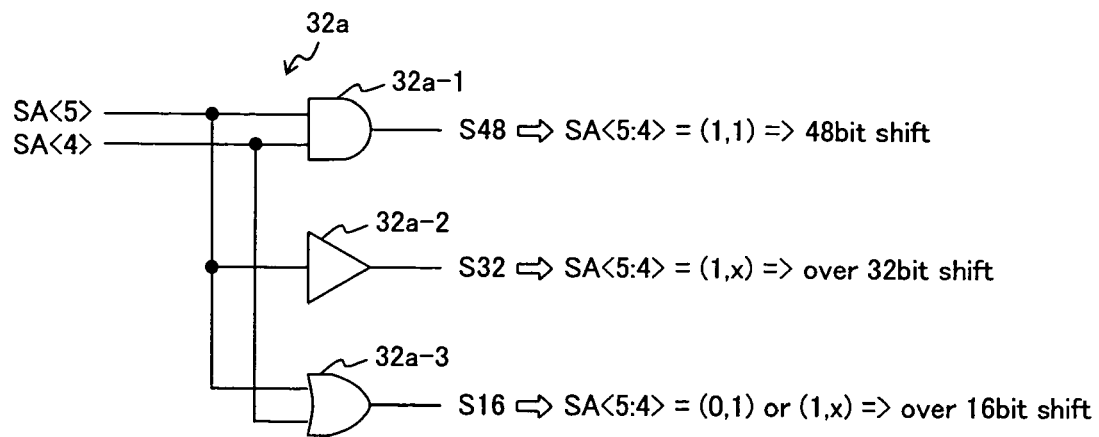
FIG. 3 is a diagram showing an example of a logical circuit of a logical sum calculating unit of the sticky bit generator in the arithmetic operation unit according to the embodiment of this invention.
Figure 4:
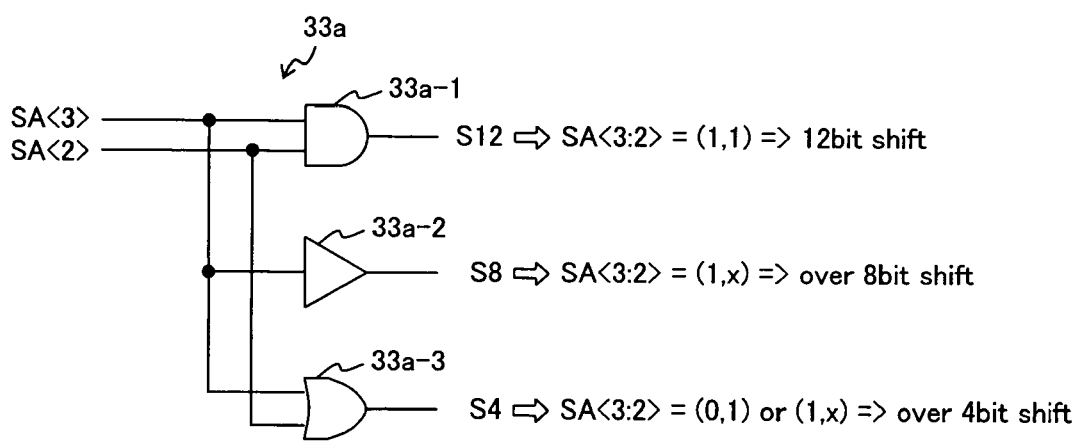
FIG. 4 is an example of a logical circuit of the logical sum calculating unit of the sticky bit generator in the arithmetic operation unit according to the embodiment of this invention.

An input signal S16 to the logical circuit 51b is realized by the logical circuit 32a shown in FIG. 3, for example. Namely, the logical sum calculating unit 51 has the logical circuit 32a comprised of an OR gate 32a-3 outputting a logical sum of SA<5> and SA<4> as S16 (signal representing whether or not a shifting of not less than "16" bits is performed). Similarly, an input signal S8 to the logical circuit 51b is realized by a logical circuit 33a shown in FIG. 4, for example. Namely, the logical sum calculating unit 51 has the logical circuit 33a comprised of a buffer gate 33a-2 outputting SA<3> as S8 (signal representing whether or not a shifting of not less than "8" bits is performed).

Subsequently, with respect to data of C<86:35>, the logical sum calculating unit 51 discriminates the data by "4" bits by "4" bits in the above manner while increasing the value of the normalizing shift amount by "1" bit at a time, and outputs a result of this as PAT<12> to PAT<1> by performing the OR operation, or performs the process by using a result of the shifting without prediction.

As shown in FIG. 5(c), with respect to the last C<38:35>, when SA<5:2> is not less than "1110," C<38:35> always falls within a range of R<98:0>. For this, a result obtained by performing the OR operation on C<38:35> is outputted as PAT<0> for this case only. When SA<5:2> is "1111," C<38:35> falls within the range of R<98:95>, or is outside the range of R<98:0>. For this, the generator 52 performs the process.

Figure 8:
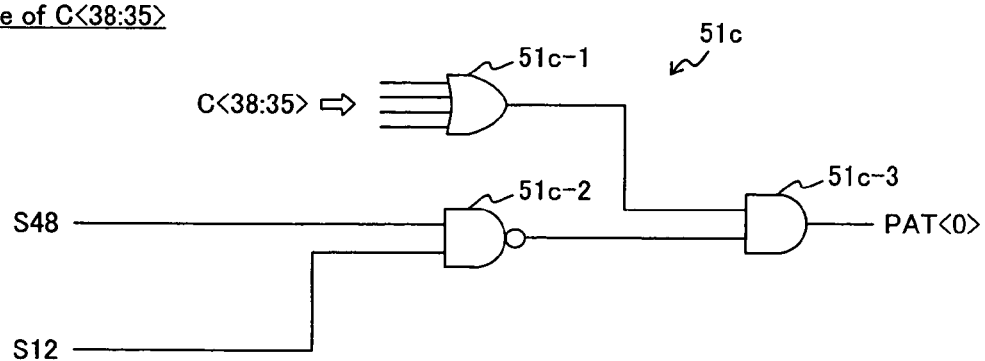
FIG. 8 is a diagram showing an example of a logical circuit of the logical sum calculating unit of the sticky bit generator in the arithmetic operation unit according to the embodiment of this invention.

The process shown in FIG. 5(C) is accomplished by a logical circuit 51c comprised of an OR gate, a NAND gate and an AND gate shown in FIG. 8, for example. Namely, the logical sum calculating unit 51 has the logical circuit 51c comprised of an OR gate 51c-1 outputting a logical sum of C<38:35>, a NAND gate 51c-2 outputting a inverted AND of S48 and S12, and a AND gate 51c-3 outputting a logical product of an output from the OR gate 51c-1 and an output from the NAND gate 51c-2 as PAT<0>. An input signal S48 to the logical circuit 51b is realized by the logical circuit 32a shown in FIG. 3, for example. Namely, the logical sum calculating unit 51 has the logical circuit 32a comprised of the AND gate 32a-1 outputting a logical product of SA<5> and SA<4> as S48 (signal representing whether or not a shifting of "48" bits is performed). Similarly, an input signal S12 to the logical circuit 51b is realized by the logical circuit 33a shown in FIG. 4, for example. Namely, the logical sum calculating unit 51 has the logical circuit 33a comprised of the AND gate 33a-1 outputting a logical product of SA<3> and SA<2> as S12 (signal representing whether or not a shifting of "12" bits is performed).

As above, the logical sum calculating unit 51 performs the above process on the data of C<94:35>, whereby PAT<14:0> is outputted.

Figure 18:
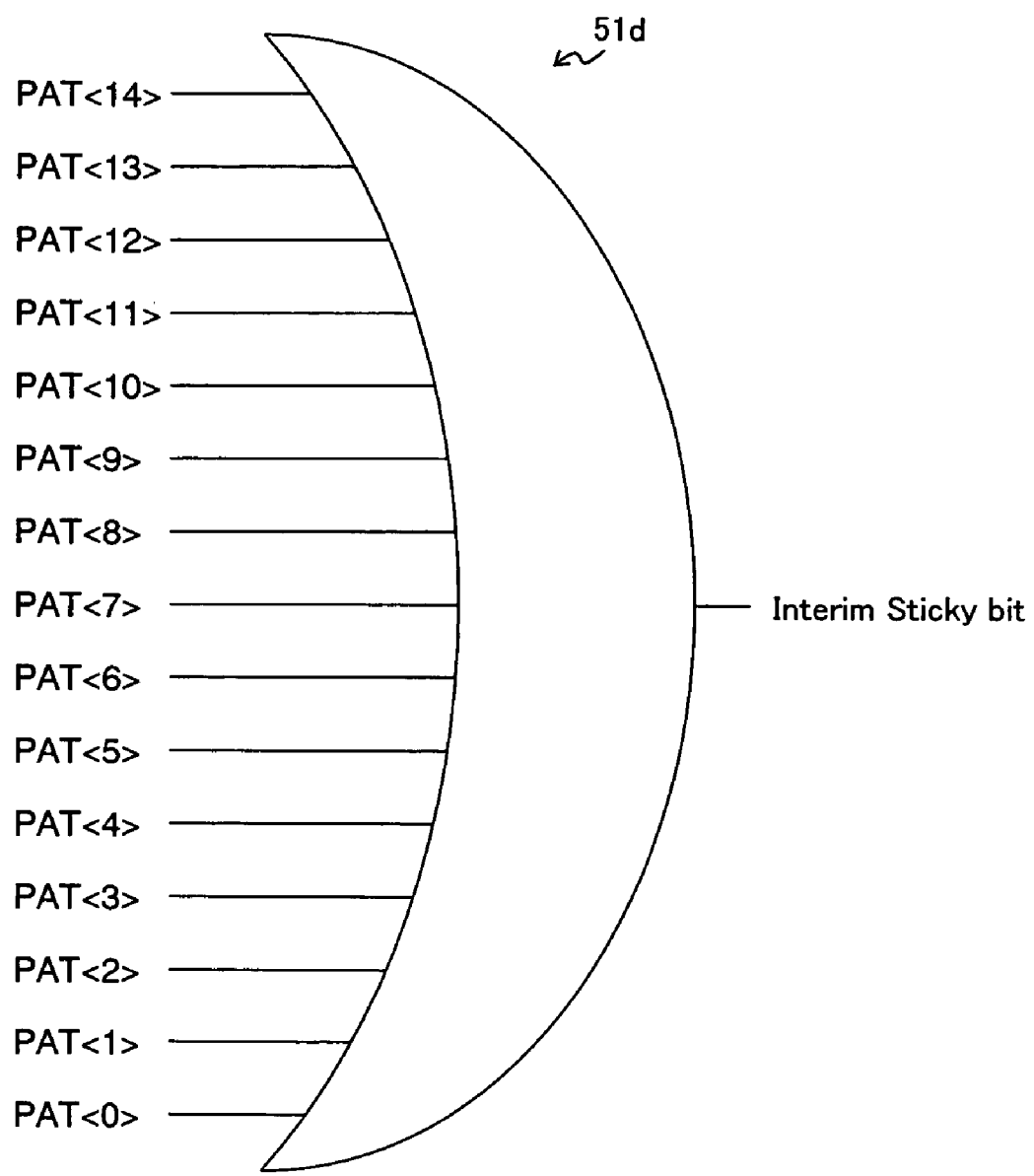
FIG. 18 is a diagram showing an OR circuit of the logical sum calculating unit of the sticky bit generator in the arithmetic operation unit according to the embodiment of this invention.

Finally, the logical sum calculating unit 51 performs the OR operation on PAT<14:0> by means of an OR circuit 51d structured as shown in FIG. 18, thereby generating an interim sticky bit. Here, when at least "1" bit in PAT<14:0> is "1," the logical sum calculating unit 51 (logical circuit 51d) sets the interim sticky bit to "ON" (that is, "1"). When all the bits are "0," the logical sum calculating unit 51 sets the interim sticky bit to "OFF" (that is, "0").

When supporting the single-precision arithmetic, the logical sum calculating unit 51 predicts data to be shifted into the sticky bit generation region by the normalizing process by the normalizer 30 (here, the first to third shifters 31 to 33) with respect to data of C<94:0> (first region), and generates an interim sticky bit on the basis of the prediction.

Next, the generator 52 will be described. The generator 52 generates a sticky bit on the basis of data within a range of R<98:95> which is the second region in the sticky bit generation region in the arithmetic operation result normalized by the normalizer 30, and the interim sticky bit calculated by the logical sum calculating unit 51.

Namely, the logical sum calculating unit 51 predicts about the normalizing process on SA<5:2> in SA<5:0> which is the normalizing shift amount, while the generator 52 does not predict the normalizing process on SA<1:0> but uses a final result of the shifting obtained by the 1-bit shifter 35.

Namely, the generator 52 performs the OR operation on a region of 4-bit-long data of R<98:95>, which is a sum of "3" bits that is the maximum shift amount that the fourth shifter 34 can shift and "1" bit that the 1-bit shifter 35 can shift.

Here, the generator 52 performs the OR operation on 5-bit-long data which is a sum of "4" bits of R<98:95> and "1" bit of the interim sticky bit. When even "1" bit in the 5-bit length data is "1," the generator 52 sets the sticky bit to "ON." When all the bits are "0," the generator 52 sets the sticky bit to "OFF."

As above, the number of bits that can be processed in the OR operation by the generator 52 is always not less than the shift amount ("1" bit, here) that the 1-bit shifter 35 can handle.

In the floating-point multiply adder 1, the fourth shifter 34 in the final stage among the first to fourth shifters 31 to 34, which function together as a first processing unit, can process the least shift amount among these plural shifters 31 to 34. This makes it possible to minimize the number of bits that can be processed in the OR operation by the generator 52, minimize the circuit scale of the generator 52, and minimize the delay of the generator 52.

Next, the generator 52 will be described. The generator 52 generates a sticky bit on the basis of data in a region (here, R<69:66>, second region) obtained by excepting the first region (C<65:0>, here) from the sticky bit generation region in the arithmetic operation result normalized by the normalizer 30, and the interim sticky bit calculated by the logical sum calculating unit 51.

Namely, the generator 52 does not predict about the normalizing process on SA<1:0>, but performs the OR operation on 4-bit data of R<69:66>.

Accordingly, the generator 52 performs the OR operation on data of "5" bits which is a sum of "4" bits of R<69:66> and "1" bit of the interim sticky bit. When even "1" bit in the 5-bit-long data is "1," the generator 52 sets the sticky bit to "ON." When all the bits are "0," the generator 52 sets the sticky bit to "OFF."

Next, the rounder 40 will be described. As shown in FIG. 2, the rounder 40 rounds the arithmetic operation result normalized by the normalizer 30 on the basis of the sticky bit generated by the generator 52 in the sticky bit generator 50. The rounder 40 comprises an incrementer (incrementing means) 41, a judge round unit (judge round means) 43 and a selecting circuit (selecting means) 44.

The incrementer 41 performs a rounding process to add "1" to the mantissa (C<123:101> in the case of the single-precision arithmetic) in the arithmetic operation result normalized by the normalizer 30.

The judge round unit 43 determines whether or not the rounding process is necessary, on the basis of (1) the sticky bit generated by the sticky bit generator 50, (2) the L (Least significant bit) bit (refer to FIGS. 14 and 15) which is the least significant bit of the mantissa in the arithmetic operation result outputted from the normalizer 30, (3) the G (Guard) bit in the arithmetic operation result, (4) the R (Round) bit (refer to FIGS. 14 and 15) in the arithmetic operation result, (5) the RD (Round Direction) bit inputted from the outside, and (6) the SIGN bit inputted from the outside. The judge round unit 43 outputs a result of the judgment to the selecting circuit 44.

The selecting circuit 44 outputs, on the basis of the judge round unit 43, either the rounded arithmetic operation result inputted via the incrementer 41 or the arithmetic operation result left as it has been outputted from the normalizer 30.

Namely, the selecting circuit 44 outputs the arithmetic operation result rounded by the incrementer 41 when the judge round unit 43 judges as a result of the judgment that the rounding process is necessary. When the judge round unit 43 judges as a result of the judgment that the rounding process is unnecessary, the selecting circuit 44 outputs the arithmetic operation result fed from the normalizer 30, which is the arithmetic operation result not undergone the rounding process.

Next, an example of operations of the normalizer 30, the sticky bit generator 50 and the rounder 40 of the floating-point multiply adder 1 (in the case where the pipeline stage is divided) will be described with reference to FIG. 10. Incidentally, FIG. 10 shows a case where the floating-point multiply adder 1 performs the single-precision arithmetic, wherein broken lines X to Z denote boundaries by which the pipeline stage is divided.

Figure 10:
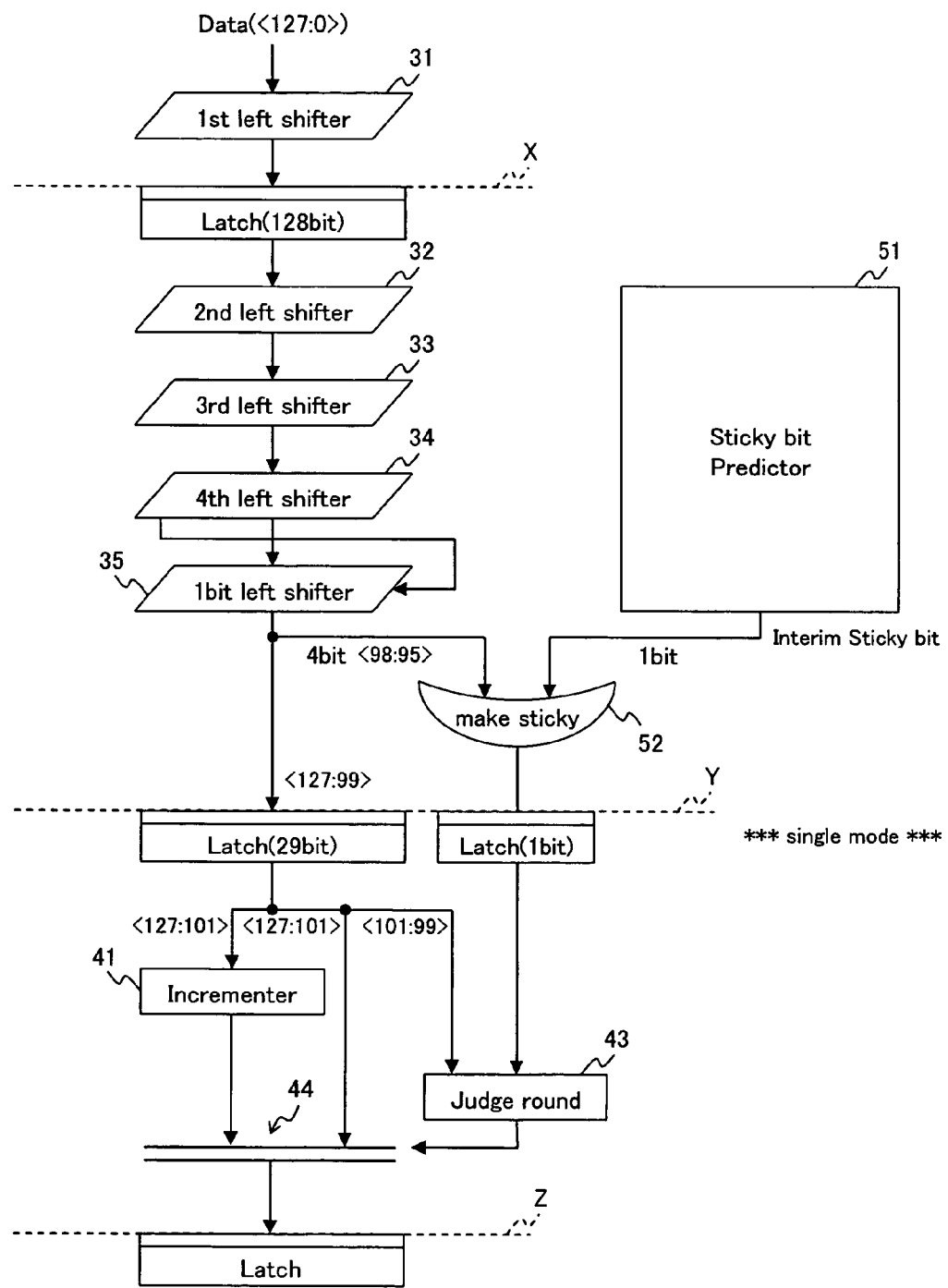
FIG. 10 is a diagram showing an example of the operation of the arithmetic operation unit according to the embodiment of this invention when the arithmetic operation unit supports the single-precision arithmetic, wherein pipeline stage is divided.

As shown in FIG. 10, in the floating-point multiply adder 1, the logical sum calculating unit 51 in the sticky bit generator 50 executes the process, in parallel to the processes performed by the second shifter 32 and the following shifters in the normalizer 30, and the generator 50 in the sticky bit generator 52 generates a sticky bit by using a result of the 1-bit shifter 35 after the normalizing process by the normalizer 30.

Heretofore, it is general that the pipeline stage is divided because the process cycle between the normalizing process by the normalizer 30 and the rounding process by the rounder 40 is prolonged, as described above. For this reason, the pipeline stage may be divided in the floating-point multiply adder 1, as denoted by a broken line Y.

In this case, data outputted from the 1-bit shifter 35 (namely, the normalizer 30) is 29-bit data of R<127:99>, which is a reminder obtained by excepting the sticky bit generation region R<98:0> from R<127:0>, thus only this 29-bit-long data has to be latched. Why the sticky bit generation region can be subtracted from the output data is that it is unnecessary to once more output R<98:0> to the rounder 40 because the sticky bit generator 50 generates the sticky bit.

It is also necessary to latch "1" bit of the sticky bit generated by the stick bit generator 50.

R<127:101> in the latched 29-bit-long data is inputted to the incrementer 41, while directly inputted to the selecting circuit 44, bypassed the incrementer 41.

3-bit-long data of R<101:99> corresponding to the L bit, the R bit and the G bit in the latched 29-bit data is inputted to the judge round unit 43 to be used for the rounding judgment.

R<127:72> in the latched 58-bit-long data is inputted to the incrementer 41, while directly inputted to the selecting circuit 44, bypassed the incrementer 41.

3-bit-long data of R<72:70> corresponding to the L bit, the R bit and the G bit to be used for the judgment by the judge round unit 43 in the latched 58-bit-long data is inputted to the judge round unit 43.

In the floating-point multiply adder 1 according to the embodiment of this invention, the logical sum calculating unit 51 calculates an interim sticky bit in parallel to the normalizing process by the normalizer 30, and the generator 52 generates a sticky bit on the basis of the interim sticky bit and data of a part of the sticky bit generation region in the arithmetic operation result normalized by the normalizer 30. Thus, it becomes unnecessary to calculate a logical sum of all data in the sticky bit generation region after the normalizing process, and it is possible to efficiently generate a sticky bit while preventing delay.

When the single-precision arithmetic is supported, the OR operation on not the 99-bit data in the sticky bit generation region but only 5-bit data is suffice after the normalizing process by the normalizer 30, which can largely shorten the delay.

When the pipeline stage is divided between the process by the normalizer 30 and the process by the rounder 40, it is necessary to latch only data in a region excepting the sticky bit generation region, not all the arithmetic operation result data (R<127:0>), because the sticky bit generation is performed in parallel to the normalizing process. Accordingly, it is possible to decrease the hardware resources (amount of materials) such as latch, etc. In concrete, it becomes possible to decrease 128-bit-long data, which is heretofore latched, to 30-bit-long data (refer to FIG. 10), which means that it is possible to decrease by "98" bits to be latched, which is a difference between them.

Further, in the floating-point multiply adder 1, the sticky bit is generated in consideration of a result of the normalizing process by the 1-bit shifter 35, that is, the sticky bit is generated on the basis of a result of the normalizing process with respect to the sticky bit generation region (second region) that may be changed according to a result of the normalizing process by the 1-bit shifter 35. For this, it becomes possible to start the generation of the sticky bit in parallel to the normalizing process by the normalizer 30. Moreover, it becomes unnecessary to discriminate whether the normalizing shift amount calculated by the shift amount calculator 20 comes short by "1" bit or not. Thus, the sticky bit can be certainly generated irrespective of whether the normalizing shift amount comes short or not. Unlike the technique disclosed in Patent Document 1 described above, an increase in delay and amount of materials caused by discrimination of whether the normalizing shift amount comes short by "1" bit can be avoided.

The logical sum calculating unit 51 does not predict about the normalizing process by the fourth shifter 34 which is the last stage in the plural shifters 31 to 34 in the normalizer 30, but the generator 52 generates a sticky bit on the basis of a result of the normalizing process by the fourth shifter 34. Namely, the second region to be processed by the generator 52 is a sum of the maximum shifting amount obtained by the fourth shifter 34 and "1" bit obtained by the 1-bit shifter 35. Therefore, the logical sum calculating unit 51 can generate a sticky bit more efficiently than the manner in which a result of the normalizing process by all the shifters (first processing unit) 31 to 34 in plural stages is predicted.

Since the fourth shifter 34 has the least shifting amount among the shifters 31 to 34 in the floating-point multiply adder 1, the process by the generator 52 becomes more efficient, and the amount of materials of the generator 52 can be reduced.

[2] As to Embodiment of the Invention in the Case of Double-Precision Arithmetic First, description will be made of a structure of a floating-point multiply adder according to an embodiment of this invention with reference to the block diagram shown in FIG. 1. Incidentally, like reference characters designate like or corresponding parts in the drawings, details of which are thus partly omitted.

As shown in FIG. 1, a floating-point multiply adder 1 comprises a right shifter (Aligner) 10, a multiplier [CSA (Carry Save Adder) Tree] 11, a CSA (Carry Save Adder) 12, an absolute value adder (Abs. Adder) 13, a shift amount calculator (L. Z. Predictor) 20, a normalizer (Left Shifter) 30, a rounder 40 and a sticky bit generator 50.

The floating-point multiply adder 1 supports the double-precision arithmetic in conformity with IEEE (The institute of Electrical and Electronic Engineers, Inc.) 754, for example.

Output data (arithmetic operation result; input data format to the normalizer 30) from the absolute value adder 13 is similar to that (c<127:0> shown in FIG. 13. The data structure (output data format from the normalizer 30) adopted when the floating-point multiply adder 1 supports the double-precision arithmetic is similar to that (R<127:0>) shown in FIG. 15. Accordingly, the arithmetic operation result (input data format) and the output data (output data format) will be described with reference to FIGS. 13 through 15, as well.

The right shifter 10, the multiplier 11, the CSA 12 and the absolute value adder 13 function together as a multiply-add operation unit executing a floating-point multiply-add operation with three operands ("OP1," "OP2" and "OP3" in the drawing). An arithmetic operation result of the multiply-add operation is expressed as C<127:0> as shown in FIG. 13.

The shift amount calculator 20 predicts how many zeros succeed from the lead of the output data (arithmetic operation result) from the absolute value adder 13. This result is a shift amount for the normalizer 30. Namely, the shift amount calculator 20 calculates a normalizing shift amount for the arithmetic operation result to be used in the left-shifting process (normalizing process) by the normalizer 30. Note that the normalizing shift amount calculated by the shift amount calculator 20 sometimes comes short by "1" bit.

The normalizer 30 conducts the left-shifting process (normalizing process) on the output data (hereinafter referred to as arithmetic operation result) from the absolute value adder 13 by using the normalizing shift amount calculated by the shift amount calculator 20. The value at a predetermined bit position (R<124>, here) in the arithmetic operation result is always set to "1" by the normalizer 30.

FIG. 2 shows structures of the normalizer 30, the rounder 40 and the sticky bit generator 50 of the floating-point multiply adder 1. As shown in FIG. 2, the normalizer 30 comprises shifters 31 to 35 in plural stages, that is, a first shifter (1st left shifter) 31, a second shifter (2nd left shifter) 32, a third shifter (3rd left shifter) 33, a fourth shifter (4th left shifter) 34 and a 1-bit shifter [1 bit left shifter (second processing unit)] 35.

The first to fourth shifters 31 to 34 function together as a first processing unit which conducts the normalizing process (left-shifting) on the arithmetic operation result by using a normalizing shift amount (7-bit data; SA<6:0>) calculated by the shift amount calculator 20.

Since the arithmetic operation result is 128-bit data, the shift amount (that is, the normalizing shift amount calculated by the shift amount calculator 20) obtained by the first to fourth shifters 31 to 34 is "127" bits at maximum. The first shifter 31 can shift by "64" or "1" bit on the basis of SA<6> in 7-bit-long data SA<6:0>, which is the normalizing shift amount. The second shifter 32 can shift by "48," "32," "16" or "0" bit on the basis of SA<5:4> in SA<6:0>. The third shifter 33 can shift by "12," "8," "4" or "0" bit on the basis of SA<3:2> in SA<6:0>. The fourth shifter 34 can shift by "3," "2," "1" or "0" bit on the basis of SA<1:0> in SA<6:0>.

To the first shifter 31, as described above, inputted is data (SA<6>) of "1" bit representing whether or not the normalizing shift amount is not less than "64" bits, that is, whether or not the first shifter 31 executes a shifting of "64" bits, in the normalizing shift amount outputted as 7-bit-long data. When SA<6> is "1," the first shifter 31 executes a shifting of "64" bits. When SA<6> is "0," the first shifter 31 does not execute a shifting.

When the normalizing shift amount inputted to the second to fourth shifters 32 to 34 is expressed as SA<5:0>, the second shifter 32 executes the normalizing process on the basis of SA<5:4>. Here, the second shifter 32 executes a shifting of "48" bits when SA<5:4> is "11," executes a shifting of "32" bits when SA<5:4> is "10," executes a shifting of "16" bits when SA<5:4> is "01," and does not execute a shifting when SA<5:4> is "00."

Similarly, the third shifter 33 executes a shifting of "12" bits when SA<3:2> is "11," executes a shifting of "8" bits when SA<3:2> is "10," executes a shifting of "4" bits when SA<3:2> is "01," and does not execute a shifting when SA<3:2> is "0."

Likewise, the fourth shifter 34 executes a shifting of "3" bits when SA<1:0> is "11," executes a shifting of "2" bits when SA<1:0> is "10," executes a shifting of "1" bit when SA<1:0> is "01," and does not execute a shifting when SA<1:0> is "00."

The 1-bit shifter 35 determines whether or not the value at the predetermined bit position R<124> is shifted to be "1" (whether the normalizing shift amount comes short or not) as a result of the normalizing process based on the normalizing shift amount by the fourth shifter 34. When the value at the predetermined bit position is not "1," the 1-bit shifter 35 determines that the normalizing shift amount calculated by the shift amount calculator 20 comes short by "1" bit, the 1-bit shifter further shifts by "1" bit the arithmetic operation result normalized by the fourth shifter 34. Whereby, the data at the predetermined bit position becomes "1," as a result.

Namely, the 1-bit shifter 35 determines whether the value at the predetermined bit position in the output data from the fourth shifter 34 is "0" or "1." When the value is "1," the 1-bit shifter does not execute the shifting process.

When the value at the predetermined bit position is "0" because the normalizing shift amount calculated by the shift amount calculator 20 comes short by "1" bit, the 1-bit shifter shifts the output data form the fourth shifter 34 by "1" bit in order to complete the normalizing process (namely, in order to set the value at the predetermined bit position to "1").

In the floating-point multiply adder 1, the sticky bit generator 50 generates a sticky bit in parallel to the normalizing process by the normalizer 30. For this, the normalizer 30 outputs not all the bits of the normalized arithmetic operation result but a part obtained by excluding the sticky bit generation region from the arithmetic operation result to the rounder 40. In other words, 58-bit-long data of R<127:70> is inputted to the rounder 40 in the case of the double-precision arithmetic.

As shown in FIG. 2, the sticky bit generator 50 generates a sticky bit in parallel to the normalizing process by the normalizer 30. The sticky bit generator 50 comprises a logical sum calculating unit (Sticky bit Predictor) 51 and a generator (denoted as "make sticky" in the drawing) 52.

Concretely, the sticky bit generator 50 sets the sticky bit to "ON" when even "1" bit is "1" in the sticky bit generation region (R<69:0> in FIG. 15 in the case of the double-precision arithmetic) in the output data (R<127:0>) fed from the normalizer 30. When all the bits in the sticky bit generation region is "0," the sticky bit generator 50 sets the sticky bit to "OFF." The sticky bit generator 50 generates a sticky bit by means of the logical sum calculating unit 51 and the generator 52.

The logical sum calculating unit 51 predicts whether or not data in a predetermined region from the least significant bit in the arithmetic operation result is shifted into the sticky bit generation region by the normalizing process by the normalizer 30, in parallel to the normalizing process by the normalizer 30, and calculates a logical sum of data that is predicted to be shifted into the sticky bit generation region as an interim sticky bit.

Here, the logical sum calculating unit 51 predicts whether or not data in the predetermined region (first region) of the arithmetic operation result normalized by the first shifter 31 is shifted into the sticky bit generation region by the normalizing process by the normalizer 30, by using the normalizing shift amount (4-bit data; SA<5:2>) inputted to the second and third shifters 32 and 33, and determines whether or not the data predicted to be shifted into the sticky bit generation region includes "1." Whereby, the logical sum calculating unit 51 generates the interim sticky bit.

When the floating-point multiply adder 1 supports the double-precision arithmetic, whether or not there is "1" within a region of R<69:0> can be realized by checking whether or not there is "1" within a region of C<69:0> by the use of the normalizing shift amount because the normalizer 20 conducts the left-shifting process on the arithmetic operation result.

In the case of the double-precision arithmetic, the logical sum calculating unit 51 first performs the OR operation on C<5:0> of R<69:64> that is obtained even when a shifting of "64" bits, which is the maximum width that the second shifter 32 and the following shifters can shift, is performed.

Next, the logical sum calculating unit 51 processes a portion excepting the range included in R<69:0> irrespective of the normalizing shift amount, that is, C<65:6>.

The logical sum calculating unit 51 conducts the OR operation on each 4 bits of a portion of C<65:6> remaining within the range of R<69:0> even when the shifting process based on the normalizing shift amount (SA<5:2>) is performed, and verifies it.

As shown in FIG. 9(a), with respect to C<65:62>, when SA<5:2> is "0000," C<65:62> always remains in the range of R<69:0>. For this, a result of the OR operation on C<65:62> is outputted as PAT<14> for this case only. When SA<5:2> is "0001," C<65:62> falls within the range of R<69:66> or is outside the range of R<69:0>. For this, the process by the generator 52 is performed by use of this shift result. This process is accomplished by a logical circuit similar to the logical circuit 51a described above with reference to FIG. 6, for example.

As shown in FIG. 9(b), with respect to C<61:58>, when SA<5:2> is equal to or smaller than "0001," C<61:58> always remains within the range of R<69:0>, thus a result of the OR operation on C<61:58> is outputted as PAT<13> for this case only. When SA<5:2> is "0010," C<61:58> falls within the range of R<69:66> or is outside the range of <69:0>, thus the process by the generator 52 is performed. This process is accomplished by a logical circuit similar to the logical circuit 51b described above with reference to FIG. 7.

Thereafter, with respect to data within the range of C<57:6>, discrimination is performed on each "4" bits while increasing the value of the normalizing shift amount "1" bit by "1" bit, and the OR operation is performed or the generator 52 processes by use of the shift result without prediction.

As shown in FIG. 9(c), with respect to the final C<9:6>, when SA<5:2> is equal to or smaller than "1110," C<9:6> always remains in the range of R<69:0>, thus a result of the OR operation is outputted as PAT<0> for this case only. When SA<5:2> is "1111," C<9:6> falls within the range of R<69:66> or is outside the range of R<69:0>, thus the process by the generator 52 is performed. This process is accomplished by a logical circuit similar to the logical circuit 51c described above with reference to FIG. 8.

As above, the logical sum calculating unit 51 processes the data within the range of C<65:6>, thereby outputting PAT<14:0>.

Finally, the logical sum calculating unit 51 conducts the OR operation on PAT<14:0> by means of a logical circuit 51d structured as shown in FIG. 18, thereby generating an interim sticky bit as does in the single-precision arithmetic.

When supporting the double-precision arithmetic, the logical sum calculating unit 51 targets data of C<65:0> (first region), predicts data that will be shifted into the sticky bit generation region by the normalizing process by the normalizer 30 (here, the first to third shifters 31 to 33), and generates an interim sticky bit on the basis of this prediction.

Next, the generator 52 will be described. The generator 52 generates a sticky bit on the basis of data in a region (here, R<69:66>; second region) obtained by excepting the first region (C<65:0>, here) from the sticky bit generation region in the arithmetic operation result normalized by the normalizer 30, and the interim sticky bit calculated by the logical sum calculating unit 51.

Namely, the generator 52 does not predict the normalizing process on SA<1:0>, but performs the OR operation on 4-bit data of R<69:66>.

Accordingly, the generator 52 performs the OR operation on "4" bits of R<69:66> and "1" bit of the interim sticky bit, totaling "5" bits. When even "1" bit is "1" in the 5-bit data, the generator 52 sets the sticky bit to "ON." When all the bits are "0," the generator 52 sets the sticky bit to "OFF."

Next, the rounder 40 will be described. As shown in FIG. 2 the rounder 40 performs the rounding process on the arithmetic operation result normalized by the normalizer 30 on the basis of the sticky bit generated by the generator 52 in the sticky bit generator 50. The rounder 40 comprises an incrementer 41, a judge round unit 43 and a selecting circuit 44.

The incrementer 41 performs the rounding process to add "1" to the mantissa (C<123:72> in the case of the double-precision arithmetic) in the arithmetic operation result normalized by the normalizer 30.

The judge round unit 43 determines whether or not the rounding process is necessary, on the basis of (1) the sticky bit generated by the sticky bit generator 50, (2) the L (Least significant) bit that is the least significant bit of the mantissa in the arithmetic operation result outputted from the normalizer 30 (refer to FIGS. 14 and 15), (3) the G (Guard) bit in the arithmetic operation result, (4) the R (Round) bit in the arithmetic operation result (refer to FIGS. 14 and 15), (5) the RD (Round Direction) bit inputted from the outside, and (6) the SIGN bit inputted from the outside. The judge round unit 43 outputs a result of the judgment to the selecting circuit 44.

The selecting circuit 44 outputs, on the basis of a result of judgment by the judge round 43, either the rounded arithmetic operation result inputted via the incrementer 41 or the arithmetic operation result left as it has been outputted from the normalizer 30.

Namely, when the judge round 43 judges as a result that the rounding process is necessary, the selecting circuit 44 outputs the arithmetic operation result rounded by the incrementer 41. When the judge round 43 judges as a result that the rounding process is unnecessary, the selecting circuit 44 outputs the arithmetic operation result fed from the normalizer 30, which is not rounded.

Figure 11:
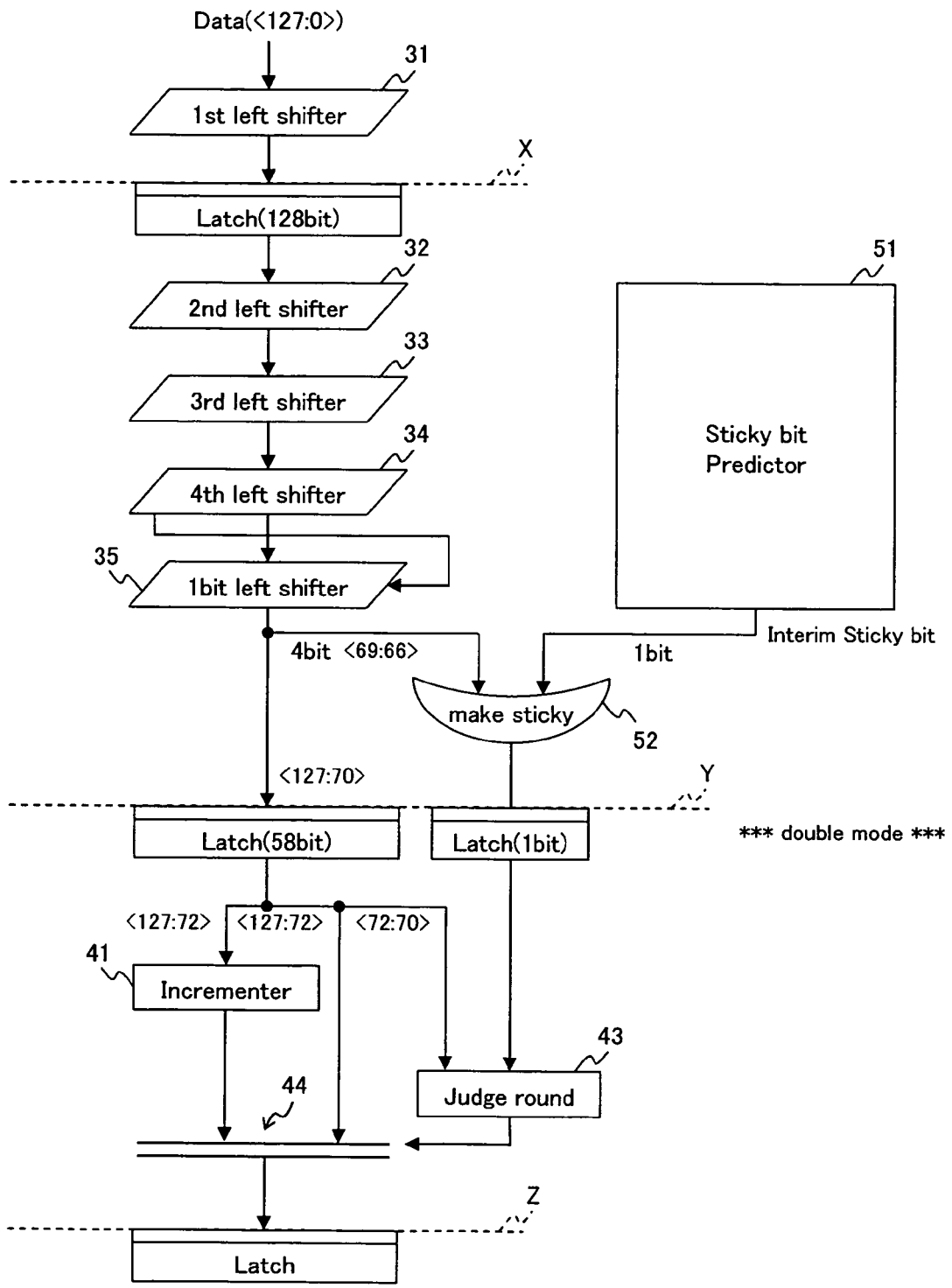
FIG. 11 is a diagram showing an example of the operation of the arithmetic operation unit according to the embodiment of this invention when the arithmetic operation unit supports the double-precision arithmetic, wherein the pipeline stage is divided.
Figure 12:
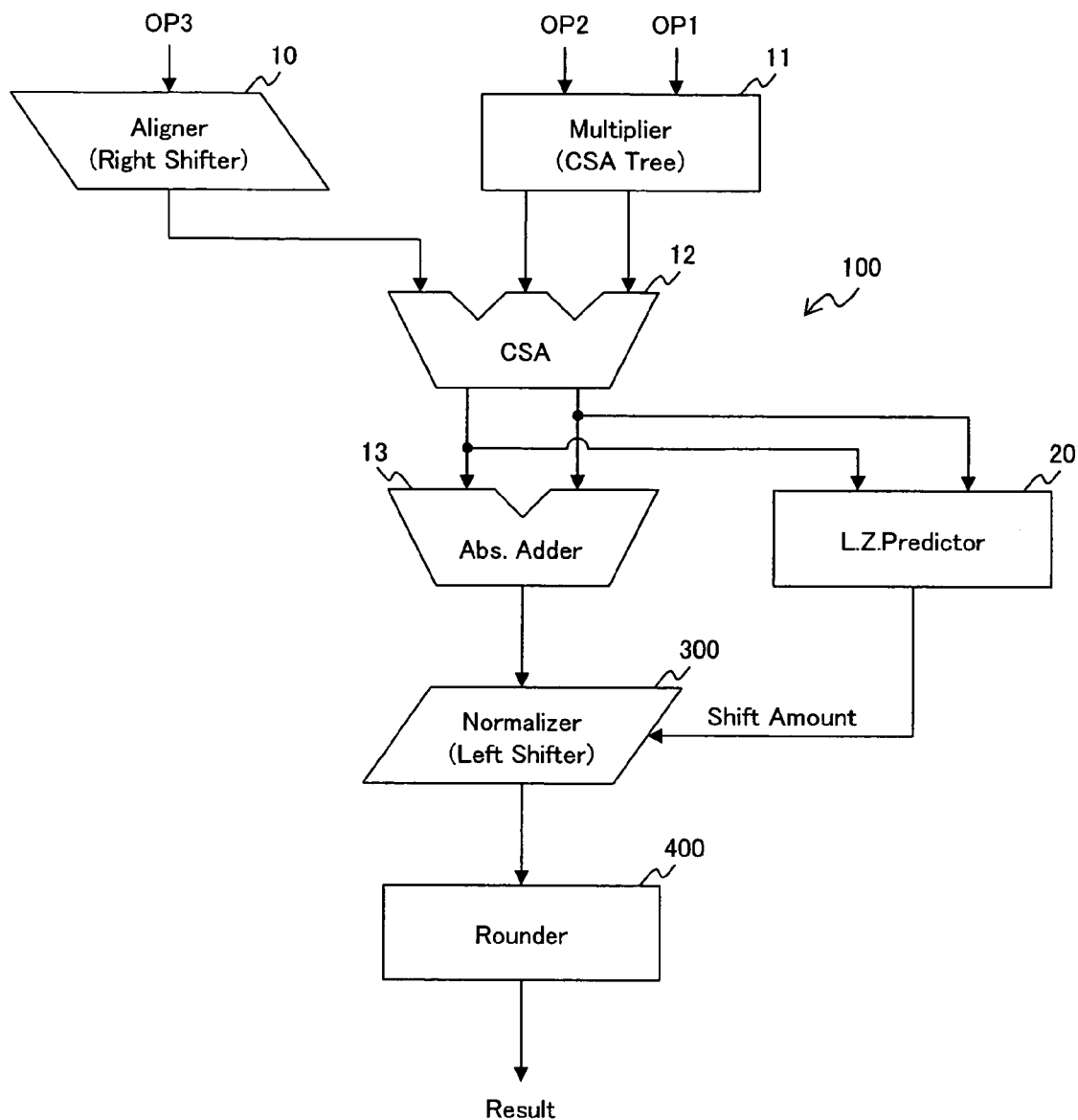
FIG. 12 is a block diagram showing a structure of a known floating-point multiply adder.

FIG. 11 shows an example of the operation of the floating-point multiply adder 1 when the floating-point multiply adder 1 performs the double-precision arithmetic. In this case, data outputted from the 1-bit shifter 35 (namely, the normalizer 30) is 58-bit-long data of R<127:70> obtained by subtracting the sticky bit generation region R<69:0> from R<127:0>. Accordingly, it is necessary to latch only the 58-bit data.

R<127:72> in the latched 58-bit-long data is inputted to the incrementer 41, while directly inputted to the selecting circuit 44, bypassed the incrementer 41.

3-bit-long data of R<72:70> corresponding to the L bit, the R bit and the G bit used for the judgment by the judge round unit 43 in the latched 58-bit-long data is inputted to the judge round unit 43.

In the floating-point multiply adder 1 according to the embodiment of this invention, the logical sum calculating unit 51 calculates an interim sticky bit in parallel to the normalizing process by the normalizer 30, and the generator 52 generates a sticky bit on the basis of the interim sticky bit and data in a part of the sticky bit generation region in the arithmetic operation result normalized by the normalizer 30. Accordingly, it is unnecessary to calculate a logical sum of all data in the sticky bit generation region after the normalizing process, and it is possible to efficiently generate a sticky bit while preventing delay.

Concretely, when the floating-point multiply adder 1 supports the double-precision arithmetic, the OR operation on only 5-bit data, not 70-bit data in the sticky bit generation region is necessary, after the normalizing process by the normalizer 30. This can largely shorten the delay.

When the pipeline stage is divided between the process by the normalizer 30 and the process by the rounder 40, sticky bit generation is performed in parallel to the normalizing process. Accordingly, it is unnecessary to latch all the data of the arithmetic operation result (R<127:0), but it is necessary to latch only a region excepting the sticky bit generation region, which can reduce the hardware resources (amount of materials) of the latches, etc. Practically, it is possible to decrease 128-bit-long data latched heretofore to 59-bit-long data (refer to FIG. 11) in the floating-point multiply adder for the double-precision arithmetic, thus a latch for "69" bits that is a difference between them can be omitted.

In the floating-point multiply adder 1, a sticky bit is generated in consideration of a result of the normalizing process by the 1-bit shifter 35, that is, a sticky bit is generated on the basis of a result of the normalizing process on the sticky bit generation region (second region) that may be changed according to the normalizing process by the 1-bit shifter 35. For this, it is unnecessary to discriminate whether or not the normalizing shift amount calculated by the shift amount calculator 20 comes short by "1" bit, while the generation of a sticky bit is started in parallel to the normalizing process by the normalizer 30. Accordingly, it is possible to certainly generate a sticky bit irrespective of whether or not the normalizing shift amount comes short by "1" bit. Thus, an increase in delay or amount of materials caused by discrimination of whether or not the normalizing shift amount comes short by "1" bit does not occur, unlike the technique disclosed in Patent Document 1 described above.

The logical sum calculating unit 51 does not perform prediction about the normalizing process by the fourth shifter 34 which is in the last stage of the shifters 31 to 34 in the plural stages in the normalizer 30, but the generator 52 generates a sticky bit on the basis of a result of the normalizing process by the fourth shifter 34. Namely, the second region to be processed by the generator 52 is a sum of the maximum shift amount obtained by the fourth shifter 34 and "1" bit obtained by the 1-bit shifter 35. Accordingly, it is possible to generate an interim sticky bit more efficiently than a method where the logical sum calculating unit 51 predicts a result of the normalizing process by all the shifters 31 to 34 (first processing unit) in plural stages.

Since the fourth shifter 34 has the least shift amount among the shifters 31 to 34, the process by the generator 52 becomes more efficiently, and the amount of materials forming the generator 52 can be reduced.

[3] Others

Note that the present invention is not limited to the above examples, but may be modified in various ways without departing from the scope and spirit of the invention.

For example, the shift amounts in the shifters 31 to 34 in the plural stages constituting the first processing unit in the above embodiment are not limited to the above examples, but may be varied.

The above embodiments have been described by way of examples where the normalizing shift amount calculated by the shift amount calculator 20 sometimes comes short by "1" bit. However, the amount of shortage of the normalizing shift amount is not limited to this.

In the above embodiments, the floating-point multiply adder 1 performs the single-precision arithmetic and the double-precision arithmetic. However, this invention is not limited to this. The arithmetic precision that the floating-point multiply adder 1 of this invention supports is not limited to these, but may be n-fold precision arithmetic (n is an integer).

What is claimed is:

1. An information processing apparatus comprising:
a multiply adder unit executing a multiply-add arithmetic operation;
a shift amount calculator calculating a normalizing shift amount for a result of the arithmetic operation by said multiply adder unit;

a normalizer normalizing the arithmetic operation result obtained by said multiply adder unit, by using the normalizing shift amount calculated by said shift amount calculator;

a logical sum calculator predicting of whether data in a predetermined region (hereinafter referred to as a first region) comprising least significant bits of the arithmetic operation result is to remain in a sticky bit generation region after the normalizing process by said normalizer, and calculating a logical sum of data that is predicted to remain in the sticky bit generation region as an interim sticky bit, in parallel to the normalizing process by said normalizer;

a generator generating a sticky bit on the basis of (i) data in a region (hereinafter referred to as a second region) obtained by excepting a region corresponding to the first region from the sticky bit generation region in the arithmetic operation result, which is normalized by said normalizer, and (ii) the interim sticky bit, calculated by said logical sum calculator; and a rounder rounding the arithmetic operation result normalized by said normalizer on the basis of the sticky bit generated by said generator.

2. The information processing apparatus according to claim 1, said normalizer further comprising:

a first processing unit performing the normalizing process on the basis of the normalizing shift amount; and a 1-bit shifter determining whether the normalizing shift amount falls short on the basis of a result of the normalizing process by said first processing unit, and further performing the normalizing process on the result of the normalizing process by using a deficient shift amount when determining that the normalizing shift amount falls short;

a total number of bits in the second region of the sticky bit generation region being equal to or greater than the deficient shift amount that is able to be normalized by said 1-bit shifter.

3. The information processing apparatus according to claim 2, wherein said 1-bit shifter of the normalizer not executing the normalizing process when determining that the normalizing shift amount does not fall short.

4. The information processing apparatus according to claim 3, wherein said first processing unit of said normalizer is comprised of shifters in plural stages shifting the arithmetic operation result on the basis of the normalizing shift amount;

a total number of bits in the second region of the sticky bit generation region is a sum of a maximum normalizing shift amount that a shifter in the last stage among said shifters in the plural stages handles and the deficient shift amount that said 1-bit shifter is able to handle.

5. The information processing apparatus according to claim 4, wherein said shifter in the last stage of said first processing unit of said normalizer handling the least shift amount among said shifters in the plural stages.

6. The information processing apparatus according to claim 5, wherein a region obtained by excepting the sticky bit generation region from the arithmetic operation result is inputted from said normalizer to said rounder.

7. The information processing apparatus according to claim 4, wherein a region obtained by excepting the sticky bit generation region from the arithmetic operation result is inputted from said normalizer to said rounder.

8. The information processing apparatus according to claim 3, wherein a region obtained by excepting the sticky bit generation region from the arithmetic operation result is inputted from said normalizer to said rounder.

9. The information processing apparatus according to claim 2, wherein said first processing unit of said normalizer is comprised of shifters in plural stages shifting the arithmetic operation result on the basis of the normalizing shift amount;

a total number of bits in the second region of the sticky bit generation region is a sum of a maximum normalizing shift amount that a shifter in the last stage among said shifters in the plural stages handles and the deficient shift amount that said 1-bit shifter is able to handle.

10. The information processing apparatus according to claim 9, wherein said shifter in the last stage of said first processing unit of said normalizer handling the least shift amount among said shifters in the plural stages.

11. The information processing apparatus according to claim 10, wherein a region obtained by excepting the sticky bit generation region from the arithmetic operation result is inputted from said normalizer to said rounder.

12. The information processing apparatus according to claim 9, wherein a region obtained by excepting the sticky bit generation region from the arithmetic operation result is inputted from said normalizer to said rounder.

13. The information processing apparatus according to claim 2, wherein a region obtained by excepting the sticky bit generation region from the arithmetic operation result is inputted from said normalizer to said rounder.

14. The information processing apparatus according to claim 1, wherein a region obtained by excepting the sticky bit generation region from the arithmetic operation result is inputted from said normalizer to said rounder.

15. An information processing method executed by an information processing apparatus, the method comprising:

executing a multiply-add arithmetic operation;

calculating a normalizing shift amount for a result of the multiply-add arithmetic operation;

normalizing the multiply-add arithmetic operation result, by using the normalizing shift amount;

predicting whether data in a predetermined region (hereinafter referred to as a first region) comprising least significant bits of the multiply-add arithmetic operation result is to remain in a sticky bit generation region after the normalizing process, and calculating a logical sum of data that is predicted to remain in the sticky bit generation region as an interim sticky bit, in parallel to the normalizing process;

generating a sticky bit on the basis of (i) data in a region (hereinafter referred to as a second region) obtained by excepting a region corresponding to the first region from the sticky bit generation region in the multiply-add arithmetic operation result, which is normalized, and (ii) the calculated interim sticky bit; and rounding the multiply-add arithmetic operation result which has been normalized on the basis of the generated sticky bit.

* * * * *